(12) United States Patent
Ruehl

(10) Patent No.: US 7,409,656 B1
(45) Date of Patent: Aug. 5, 2008

(54) METHOD AND SYSTEM FOR PARALLELIZING COMPUTING OPERATIONS

(75) Inventor: Roland Ruehl, San Carlos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 260 days.

(21) Appl. No.: 11/225,815

(22) Filed: Sep. 12, 2005

(51) Int. Cl.
*G06F 17/50* (2006.01)
*G06F 9/45* (2006.01)

(52) U.S. Cl. .................. 716/5; 716/4; 716/18; 703/13; 703/14

(58) Field of Classification Search ............... 716/2, 716/4, 5, 18–21; 703/13, 14
See application file for complete search history.

(56) References Cited

U.S. PATENT DOCUMENTS

| | | | |
|---|---|---|---|
| 5,581,475 | A | 12/1996 | Major |
| 5,870,313 | A | 2/1999 | Boyle et al. |
| 6,003,066 | A | 12/1999 | Ryan et al. |
| 6,009,250 | A * | 12/1999 | Ho et al. ............... 716/5 |
| 6,035,107 | A | 3/2000 | Kuehlmann et al. |
| 6,047,116 | A | 4/2000 | Murakami et al. |
| 6,066,179 | A | 5/2000 | Allan |
| 6,237,128 | B1 | 5/2001 | Folberth et al. |
| 6,324,673 | B1 | 11/2001 | Luo et al. |
| 6,505,327 | B2 | 1/2003 | Lin |
| 6,519,749 | B1 | 2/2003 | Chao et al. |
| 6,536,028 | B1 | 3/2003 | Katsioulas et al. |
| 6,560,766 | B2 | 5/2003 | Pierrat et al. |
| 6,574,788 | B1 * | 6/2003 | Levine et al. ............ 716/18 |
| 6,629,293 | B2 | 9/2003 | Chang et al. |
| 6,701,504 | B2 | 3/2004 | Chang et al. |
| 6,721,928 | B2 | 4/2004 | Pierrat et al. |
| 6,738,954 | B1 | 5/2004 | Allen et al. |
| 6,829,757 | B1 | 12/2004 | Teig et al. |
| 6,996,790 | B2 | 2/2006 | Chang |
| 7,047,506 | B2 * | 5/2006 | Neves et al. ............ 716/2 |
| 7,051,307 | B2 | 5/2006 | Ditlow et al. |
| 7,089,511 | B2 | 8/2006 | Allen et al. |
| 7,107,559 | B2 | 9/2006 | Lakshmanan et al. |
| 7,266,795 | B2 | 9/2007 | Baumgartner et al. |
| 7,318,214 | B1 | 1/2008 | Prasad et al. |
| 2001/0003843 | A1 | 6/2001 | Scepanovic et al. |
| 2002/0049956 | A1 | 4/2002 | Bozkus et al. |
| 2004/0015256 | A1 | 1/2004 | Conrad et al. |
| 2004/0019679 | A1 | 1/2004 | Sandhya et al. |
| 2004/0019892 | A1 | 1/2004 | Sandhya et al. |
| 2004/0044979 | A1 | 3/2004 | Aji et al. |

(Continued)

OTHER PUBLICATIONS

Office Action dated Jan. 11, 2008 for U.S. Appl. No. 11/228,472.

(Continued)

*Primary Examiner*—Jack Chiang
*Assistant Examiner*—Nghia M Doan
(74) *Attorney, Agent, or Firm*—Vista IP Law Group LLP

(57) ABSTRACT

Disclosed is an improved method and system for implementing parallel processing of computing operations by effectively handling dependencies between different sequences of computing operations. In some approaches, some or all operations corresponding to dependencies between different sequences of operations are duplicated among the different sequences. This approach may be used to implement parallel processing of EDA tools.

23 Claims, 29 Drawing Sheets

U.S. PATENT DOCUMENTS

| | | |
|---|---|---|
| 2004/0199887 A1 | 10/2004 | Jain et al. |
| 2005/0091634 A1 | 4/2005 | Gallatin et al. |
| 2005/0132320 A1 | 6/2005 | Allen et al. |
| 2005/0138474 A1 | 6/2005 | Jain et al. |
| 2005/0166173 A1 | 7/2005 | Cote et al. |
| 2005/0216875 A1 | 9/2005 | Zhang et al. |
| 2006/0265675 A1 | 11/2006 | Wang |

OTHER PUBLICATIONS

Office Action dated Aug. 24, 2007 for U.S. Appl. No. 11/228,472.
Office Action dated Jan. 18, 2007 for U.S. Appl. No. 11/228,472.
Office Action dated Sep. 28, 2007 for U.S. Appl. No. 11/225,816.
Office Action dated Sep. 7, 2007 for U.S. Appl. No. 11/225,853.
Office Action dated Mar. 9, 2007 for U.S. Appl. No. 11/225,853.
Bender, M.A. et al. "On-the-Fly Maintenance of Series-Parallel Relationships in Fork-Join Multithreaded Programs" Proceedings of the 16th Annual ACM Symposium on Parallelism in Algorithms and Architectures, Barcelona, Spain, 2004, pp. 133-144.
Cadence Design Systems, Inc. "Assura Layout vs. Schematic Verifier" 2003, 4 pgs., Cadence Design Systems, Inc., San Jose, CA.
Ferguson, J. "Calibre MTflex: Reducing the High Cost of Processing Power", Mar. 2004, 5 pgs., Mentor Graphics Corporation, San Jose, CA.
Fliesler, M. "Mentor Consulting Helps AMD Win Another Race to Market", 2001, pp. 1-5, Mentor Graphics Corporation, San Jose, CA.
Kalas, I. et al. "FTL: A Multithreaded Environment for Parallel Computation" Proceedings of the 1994 Conference of the Centre for Advanced Studies on Collaborative Research, Toronto, Ontario, Canada, 1994, pp. 1-12.
Krishnaswamy, V. et al. "Actor Based Parallel VHDL Simulation Using Time Warp" Proceedings of the 10th Workshop on Parallel and Distributed Simulation, 1996, pp. 135-142.
Lee, P.M. et al. "A Parallel and Accelerated Circuit Simulator with Precise Accuracy" Proceedings of the 15th International Conference on VLSI Design (VLSI '02), Bangalore, India, Jan. 7-11, 2002, pp. 1-6.
Magarshack, P. et al. "System-on-Chip Beyond the Nanometer Wall" Proceedings of the 40th Conference on Design Automation (DAC '03), Anaheim, CA, Jun. 2-6, 2003, pp. 419-424.
Mentor Graphics Corporation "Mentor Graphics Unveils Calibre MTflex to Combat Cost of Nanometer Design Compute Requirements", May 12, 2003, 2 pgs., Mentor Graphics Corporation, San Jose, CA.
Mentor Graphics Corporation "Calibre LVS: Precise IC Layout Verification with the Schematic Design", 2005, 4 pgs., Mentor Graphics Corporation, San Jose, CA.
Prabhu, A.M. "Management Issues in EDA" Proceedings of the 31st Conference on Design Automation (DAC '94), San Diego, CA, Jun. 6-10, 1994, pp. 41-47.
Saavedra-Barrera, R.H. et al. "Analysis of Multithreaded Architectures for Parallel Computing" Proceedings of the Second Annual ACM Symposium on Parallel Algorithms and Architectures (SPAA '90), Island of Crete, Greece, 1990, pp. 169-178.
Schellenberg, F. "Mask EDA Workshop" Copyright 1999-2001, 47 pgs., Mentor Graphics Corporation, San Jose, CA.
Spiller, M.D. et al. "EDA and the Network" Proceedings of the 1997 IEEE/ACM International Conference on Computer-Aided Design (CAD '97), San Jose, CA, 1997, pp. 470-476.
Office Action dated Apr. 4, 2008 for U.S. Appl. No. 11/520,487.
Office Action dated Jun. 11, 2008 for U.S. Appl. No. 11/225,853.
Office Action dated Apr. 8, 2008 for U.S. Appl. No. 11/225,816.

* cited by examiner

| Node | 802 IE | 804 IE | 806 IE | 808 | 810 IE | 812 | 814 | 816 | 818 | 820 |
|---|---|---|---|---|---|---|---|---|---|---|
| Leaf Subgraph | | | | | | | | | | |

Go to Fig. 8B to begin upwards traversal from node 818

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | | | | | | | SG-818 | | SG-818 | |

Go to Fig. 8C to begin upwards traversal from node 814 to 808

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | | | | SG-818 | | | SG-818 | | SG-818 | |

Go to Fig. 8D to begin upwards traversal from node 808 to 802

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 | | | SG-818 | | | SG-818 | | SG-818 | |

Go to Fig. 8E to begin downwards traversal from node 802

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 | | | SG-818 | | | SG-818 | | SG-818 | |

Go to Fig. 8F to begin upwards traversal from node 814 to 810

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 | | | SG-818 | SG-818 | | SG-818 | | SG-818 | |

Go to Fig. 8G to begin upwards traversal from node 810 to 802

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 | | | SG-818 | SG-818 | | SG-818 | | SG-818 | |

Go to Fig. 8H to begin upwards traversal from node 810 to 804

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 | SG-818 | | SG-818 | SG-818 | | SG-818 | | SG-818 | |

Go to Fig. 8I to begin downwards traversal from node 810

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 | SG-818 | | SG-818 | SG-818 | | SG-818 | | SG-818 | |

End traversal of nodes for Subgraph associated with Leaf Node 818

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 | SG-818 | | SG-818 | SG-818 | | SG-818 | | SG-818 | |

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 | SG-818 | | SG-818 | SG-818 | | SG-818 | | SG-818 | |

Go to Fig. 9B to begin upwards traversal from node 820 to node 816

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 | SG-818 | | SG-818 | SG-818 | | SG-818 | SG-820 | SG-818 | SG-820 |

Go to Fig. 9C to begin upwards traversal from node 816 to node 810

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 | SG-818 | | SG-818 | SG-818 SG-820 | | SG-818 | SG-820 | SG-818 | SG-820 |

Go to Fig. 9D to begin upwards traversal from node 810 to node 802

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 SG-820 | SG-818 | | SG-818 | SG-818 SG-820 | | SG-818 | SG-820 | SG-818 | SG-820 |

Go to Fig. 9E to begin downwards traversal from node 802

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 SG-820 | SG-818 | | SG-818 | SG-818 SG-820 | | SG-818 | SG-820 | SG-818 | SG-820 |

Go to Fig. 9F to begin upwards traversal from node 810 to node 804

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 | SG-818 | | SG-818 | SG-818 | | SG-818 | | SG-818 | |
| | SG-820 | SG-820 | | | SG-820 | | | SG-820 | | SG-820 |

Go to Fig. 9G to begin downwards traversal from node 810

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 SG-820 | SG-818 SG-820 | | SG-818 | SG-818 SG-820 | | SG-818 | SG-820 | SG-818 | SG-820 |

Go to Fig. 9H to begin upwards traversal from node 816 to node 812

| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 SG-820 | SG-818 SG-820 | | SG-818 | SG-818 SG-820 | SG-820 | SG-818 SG-820 | SG-818 SG-820 | SG-818 | SG-820 |

Go to Fig. 9I to begin upwards traversal from node 812 to node 806

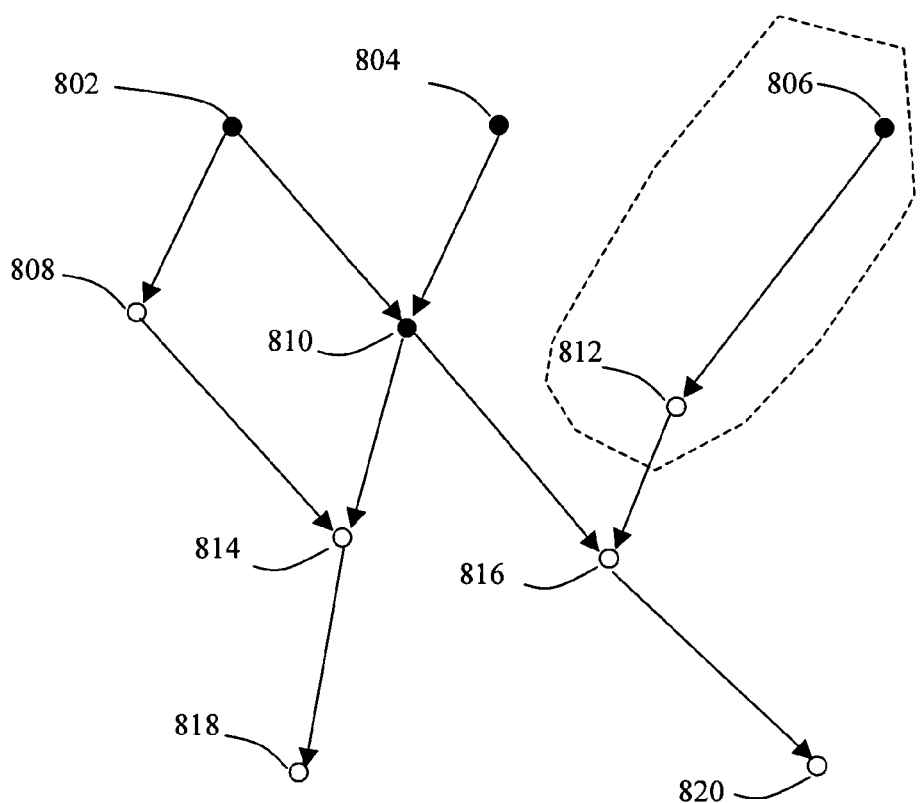
| Node | 802 IE | 804 IE | 806 IE | 808 | 810 IE | 812 | 814 | 816 | 818 | 820 |
|---|---|---|---|---|---|---|---|---|---|---|
| Leaf Subgraph Association | SG-818 | SG-818 |  | SG-818 | SG-818 |  | SG-818 |  | SG-818 |  |
|  | SG-820 | SG-820 | SG-820 |  | SG-820 | SG-820 |  | SG-820 |  | SG-820 |
Fig. 9I
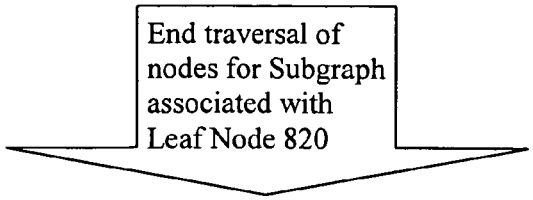
End traversal of nodes for Subgraph associated with Leaf Node 820

| Node | 802 IE | 804 IE | 806 IE | 808 | 810 IE | 812 | 814 | 816 | 818 | 820 |
|------|--------|--------|--------|-----|--------|-----|-----|-----|-----|-----|
| Leaf Subgraph Association | SG-818 | SG-818 |  | SG-818 | SG-818 |  | SG-818 |  | SG-818 |  |
|  | SG-820 | SG-820 | SG-820 |  | SG-820 | SG-820 |  | SG-820 |  | SG-820 |

METHOD AND SYSTEM FOR PARALLELIZING COMPUTING OPERATIONS

BACKGROUND AND SUMMARY

The invention relates to computing systems, and more particularly, to systems and methods for improving the performance of computing systems.

Modern computing systems are often called upon to process massive amounts of data. The amount of processing that is required to handle large volumes of data may overwhelm computing systems that utilize only a single processor. As a result, many computing functions are now implemented using parallel processing.

Parallel processing refers to the concept of speeding-up the execution of computing operations by dividing the operations into multiple fragments that can execute concurrently, each on its own processor. A set of operations being executed across n processors might execute n times faster than it would using a single processor, subject to any overhead associated with parallelizing the operations.

One problem faced by systems when attempting to parallelize operations is the existence of dependencies between different sequences of operations. For example, consider a parallel processing system in which a first sequence of operations is processed by a first CPU and a second sequence of operations is processed by a second CPU. Assume that the first sequence of operations requires the value of a given variable v, but that the variable v is established by the second sequence of operations. In this circumstance, a dependency exists between the flow of the first sequence of operations and the second sequence of operations since the first sequence cannot proceed until and unless it acquires the value of variable v from the second sequence of operations.

Such dependencies negatively affect the ability of system to parallelize computing operations. When dependencies occur between sequences of operations, they may be translated into synchronization operations, and into a data communication between CPUs on a distributed parallel platform. This forces a serialization of the operations and prevents true parallel processing.

Conventional computing systems are unable to effectively handle these types of dependencies in sequences of operations. For example, consider conventional electronic design automation (EDA) tools. The electronic design process for an integrated circuit (IC) involves EDA tools used to describing and design the behavioral, architectural, functional, and structural attributes of an IC or electronic system. Despite increases in processing power for modern computing systems, EDA execution times have not kept pace with modern designs since many modern IC designs being produced by electronics companies are constantly increasing in complexity and number of transistors. Constantly improving IC manufacturing technologies create IC chips at ever-smaller feature sizes, which allow increasingly greater quantities of transistors to be placed within the same chip area with each new generation of semiconductor processing technology. One reason parallel processing of EDA tools has not been efficiently implemented is because large amounts of dependencies typically exist within any attempt to parallelize EDA operations.

Embodiments of the present invention provide an improved method and system for implementing parallel processing of computing operations by effectively handling dependencies between different sequences of computing operations. In some embodiments of the invention, some or all operations corresponding to dependencies between different sequences of operations are duplicated among the different sequences. This approach may be used to implement parallel processing of EDA tools.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The accompanying drawings are included to provide a further understanding of the invention and, together with the Detailed Description, serve to explain the principles of the invention.

FIGS. 8A-J and 9A-J provide and illustrative example of a process for configuring subgraphs with possible duplication of nodes according to some embodiments of the invention.

DETAILED DESCRIPTION

Embodiments of the present invention provide an improved method and system for implementing parallel processing of computing operations by effectively handling dependencies between different sequences of computing operations. In some embodiments of the invention, some or all operations corresponding to dependencies between different sequences of operations are duplicated among the different sequences of operations.

Figure 1:
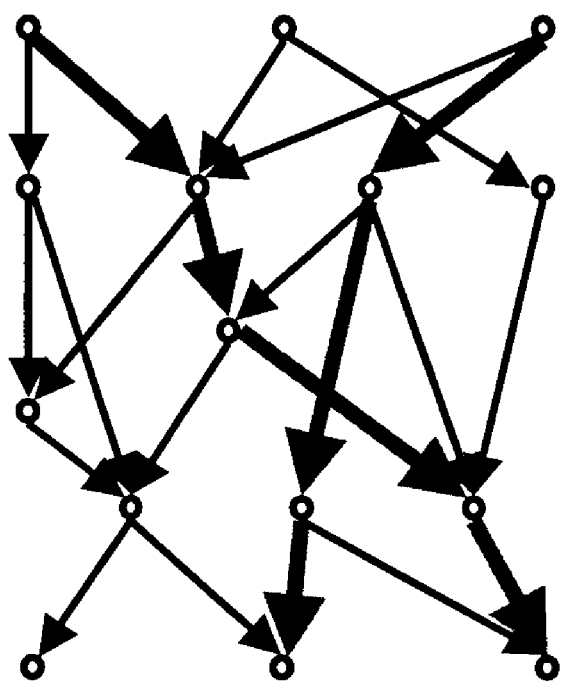
FIG. 1 depicts a dependency graph.

As shown in FIG. 1, a dependency graph is often used to represent dependencies within and between sequences of operations in a computing system. Vertices in the dependency graph denote operations to be executed. Edges in the graph denote layers that create dependencies between the operations.

In some embodiments of the invention, one or more dependency graphs are constructed and decomposed into subgraphs. Each sub-graph represents a sequence of operations that can be executed on different processing entity in parallel. Examples of such processing entities include processes, threads, tasks, CPUs, nodes, and/or networked computing stations.

Figure 2:
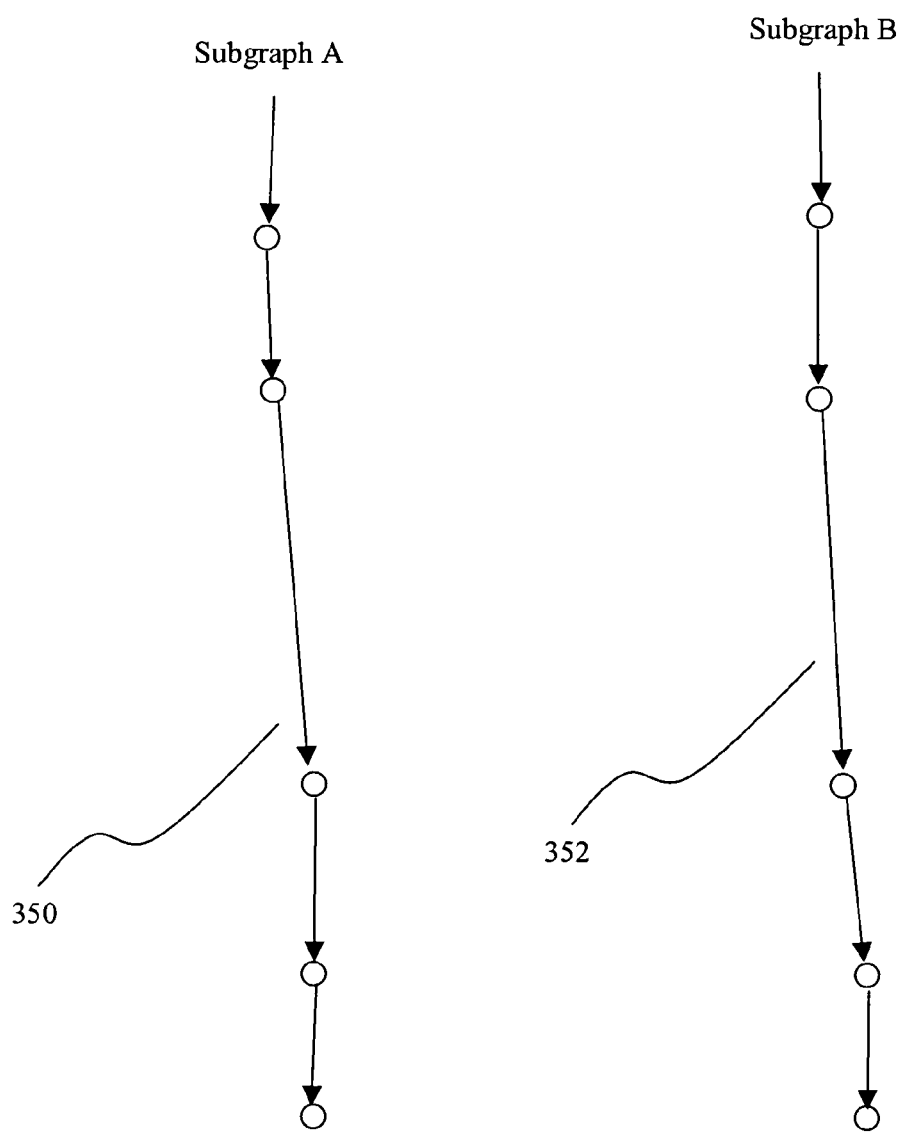
FIG. 2 illustrates two disjoint subgraphs.
Figure 3:
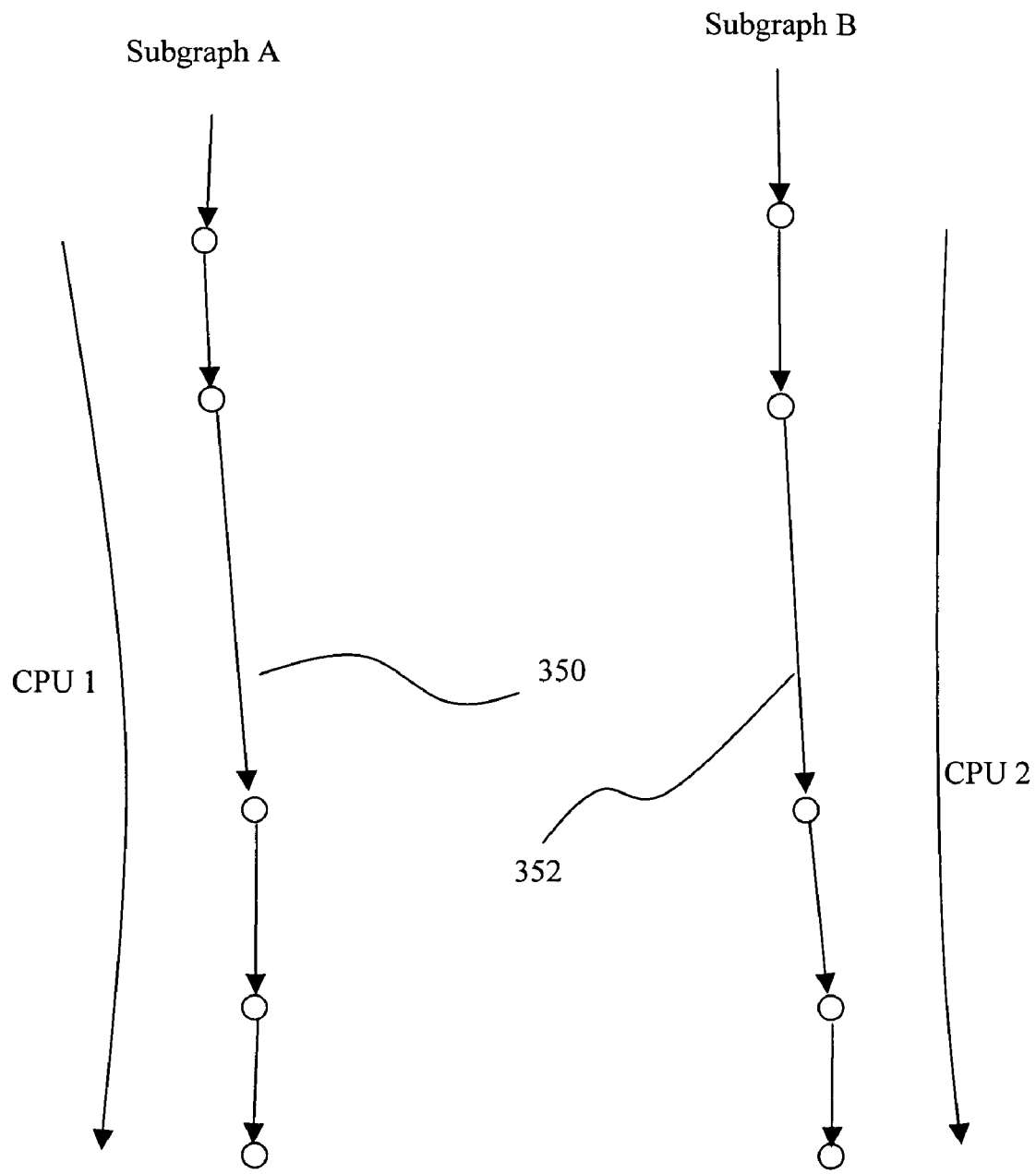
FIG. 3 shows the disjoint subgraphs of FIG. 2 processed by separates CPUs.

Consider the two subgraphs 350 and 352 shown in FIG. 2. Here, it can be seen that subgraph 350 does not overlap with subgraph 352, indicating that there are no dependencies between the two sequences of operations represented by these subgraphs. In this circumstance, it is trivial to parallelize the processing of these two sequences of operations, merely by assigning the operations associated with subgraph 350 to a first CPU and assigning the operations associated with subgraph 352 to a second CPU as represented by the illustration of FIG. 3.

Figure 4:
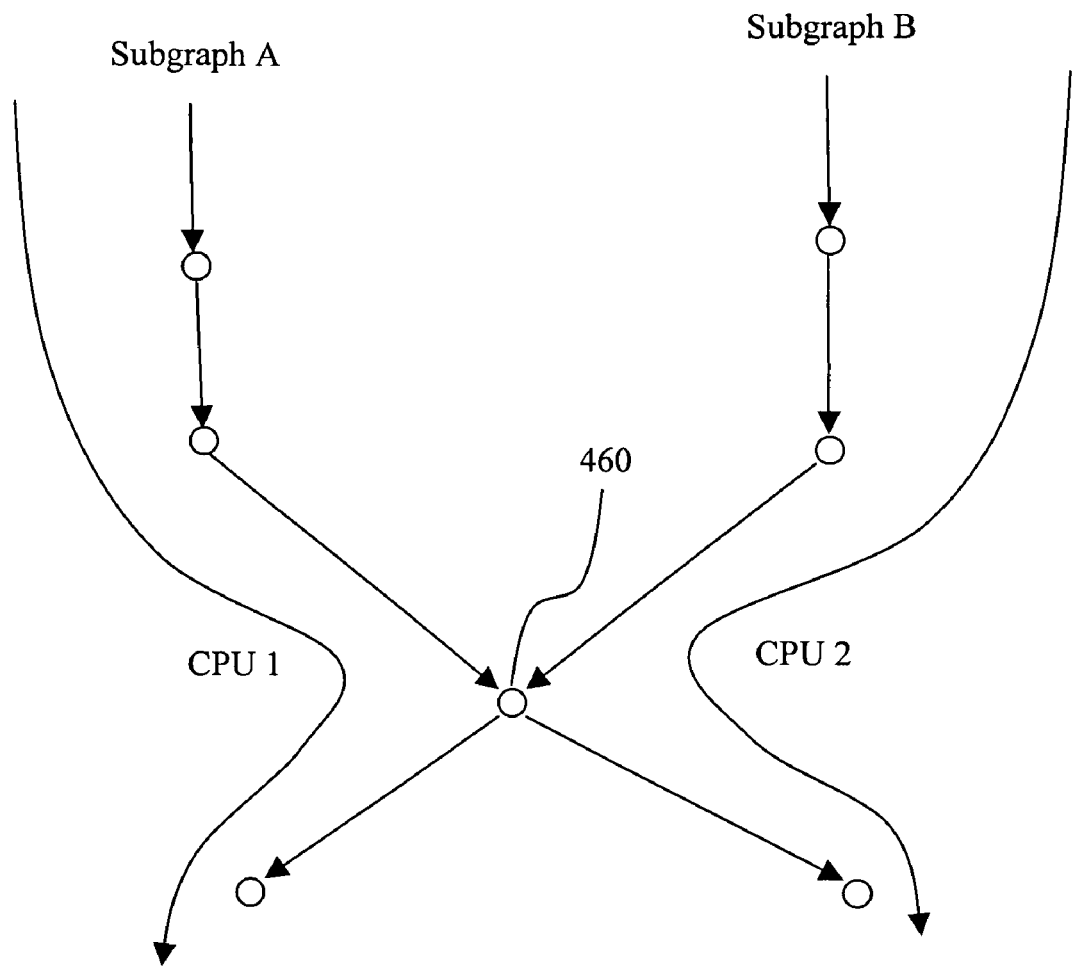
FIG. 4 shows a dependency between two subgraphs.

Referring to FIG. 4, consider an alternate circumstance in which a dependency exists between two sequences of operations. A first subgraph A exists which overlaps a second subgraph B at operation 460. In this case, a dependency exists at node/operation 460 between the two sequences of operations. Assume that subgraph A is assigned to a first CPU and subgraph B is assigned to a second CPU. The first CPU cannot complete its processing of subgraph A until the second CPU has completed processing of operations 460 for subgraph B. Similarly, the second CPU cannot complete its processing of subgraph B until the first CPU has completed processing of operations 460 for subgraph A. When such dependencies are confronted in conventional parallel processing systems, synchronization operations are performed that necessarily result in data communication between the first and second CPUs, which results in serialization of the operations for the two subgraphs.

Figure 5:
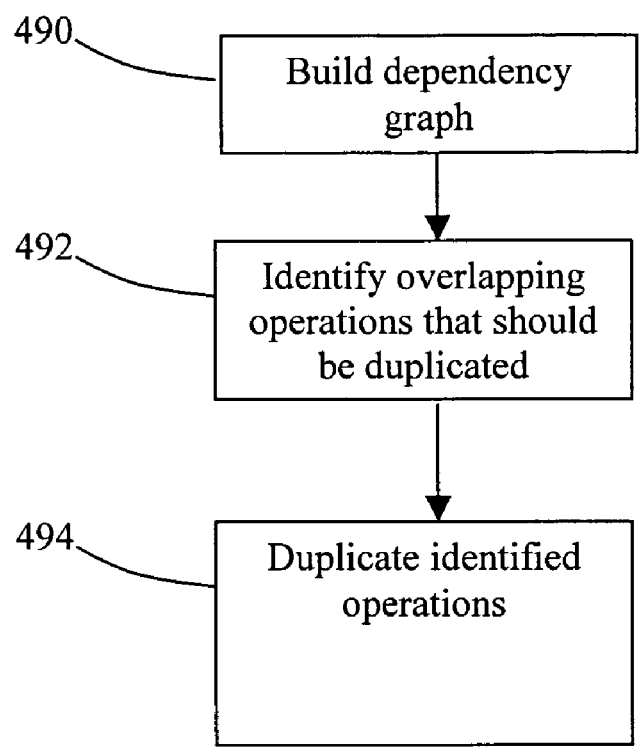
FIG. 5 shows a flowchart of a process for parallelizing computing operations according to some embodiments of the invention.

FIG. 5 is a flowchart of a process for implementing parallel processing of computing operations according to some embodiments of the invention. In this embodiment, the process duplicates some or all of the overlapping operations between sequences of operations.

At 490, a dependency graph is constructed for the set of operations to be parallelized. As explained with respect to FIG. 1, the dependency graph can be constructed with vertices corresponding to operations to be executed and edges corresponding to layers that create dependencies between the operations.

At 492, identification is made of operations which should be duplicated between different subgraphs. One approach for determining whether an operation should be duplicated is by considering the expense of a given operation. In this approach, inexpensive operations are duplicated between different subgraphs while expensive operations are not duplicated. Any suitable measure of expense may be used as appropriate for the particular purpose to which the invention is directed. Some measures of expense that could be employed include, for example, CPU utilization, network usage, and data volume.

The identified operations are then duplicated among the different subgraphs (494). When the operations associated with each subgraph are processed in parallel, the duplicated operations may thereafter be processed independently and separately by different processing entities.

Figure 6:
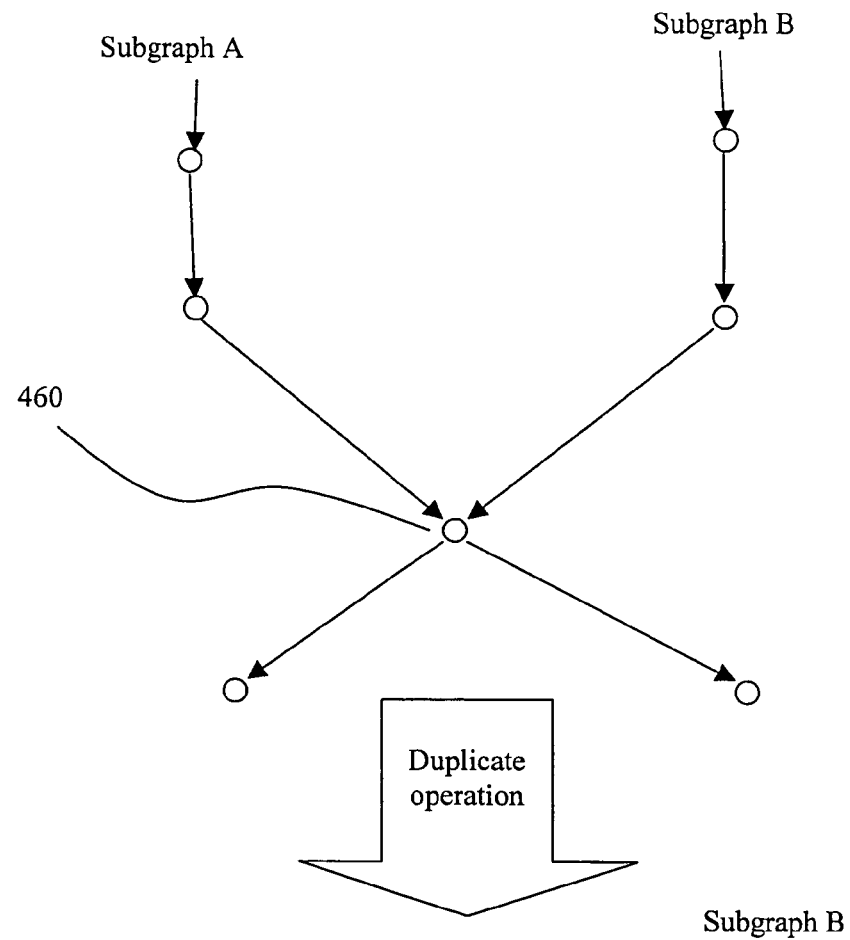
FIG. 6 depicts duplication of an operation between the subgraphs of FIG. 4.
Figure 6:
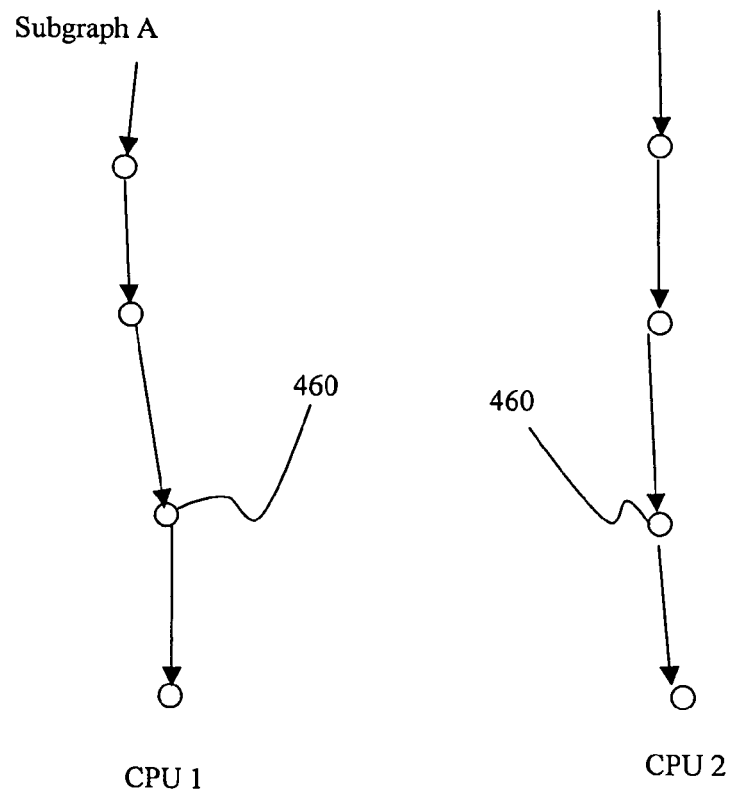

Referring to FIG. 6, consider again the example in which a first subgraph A exists which overlaps a second subgraph B at operation 460. In this case, a dependency exists at operation 460 between the two sequences of operations.

Assume that operation 460 is considered appropriate for duplication, e.g., because it is an inexpensive operation. If so, then operation 460 is duplicated at both subgraph A and subgraph B. Now, the first CPU can independently process the operations of subgraph A without regard for or communication with the second CPU that processes the operations of subgraph B, and vice versa.

It is noted that this approach is quite powerful in that it is capable of completely breaking dependencies between sequences of operations that were originally dependent upon one another. This is also very counterintuitive since the process may actually increase the overall CPU usage of the system, even though it provides faster processing times for the parallel system.

Figure 7:
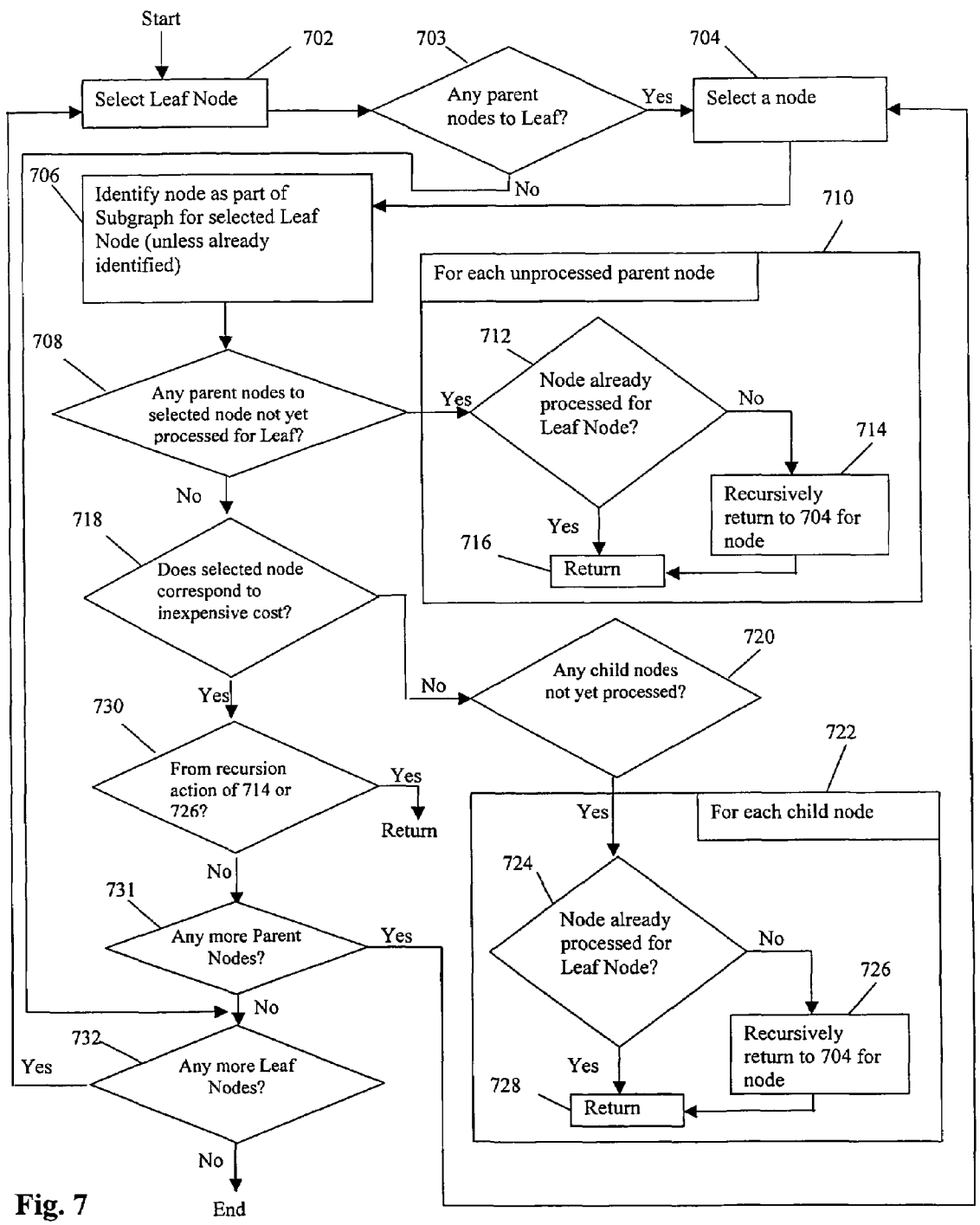
FIG. 7 shows a detailed flowchart of a process for configuring subgraphs with possible duplication of nodes according to some embodiments of the invention.

FIG. 7 shows a detailed flowchart of a process for configuring subgraphs to be processed as sequences of operations according to some embodiments of the invention. The specific process shown in this figure can be used to implement "output" partitioning, in which the intended output of some sort of processing (e.g., for an IC design layout to be verified) is partitioned into multiple portions or sections that can be individually operated upon by different processing entities. This is in contrast to "input" partitioning, in which partitioning is performed based solely upon the input data. Here, the process identifies subgraphs in a "bottom-up" approach in which subgraphs are associated with one or more identified leafs nodes from the bottom of the dependency graph, with each of the leaf nodes associated with a output or terminating operation for a sequence of operations.

The fundamental idea is to split the dependency graph into sub-graphs that can overlap. If the overlaps are too small, no speedup will result as, typically, synchronizations between operations will force most of the operations to be contained in the same sub-graph. If the overlaps are too large, no speedup will result: typically all CPUs will have to execute almost the complete dependency graph. Therefore, the process reduces the partitioning problem into an optimization problem, in which the process finds the amount of overlap between subgraphs (between zero and full overlap) that generates maximum speedup.

To partition a graph into strongly-connected components, one usually uses a recursion that, starting with the graph's leaves, walks through all nodes of a graph and assembled nodes while traversing nodes. To avoid run-time explosion, each node stores a label that is checked-and-set before the recursion continues.

The present process uses a similar partitioning algorithm. However, for certain nodes, multiple traversals are permitted. "Relaxed" nodes are identified as being eligible for duplications, and will be part of the overlaps of the sub-graphs and will be executed on multiple CPUs. In some embodiments, nodes that are identified as being eligible for duplication correspond to operations with short execution times that can be replicated, while nodes corresponding to operations with long execution times are mapped to single CPUs. Different applications for the invention can have different thresholds for determining which nodes can be duplicated. The parallel execution time of node n is the maximum time of the critical path from any root of the overall dependency graph to n.

At 702, a leaf node is selected for processing. Any of the leaf nodes that have not yet been processed and associated with a subgraph is eligible to be selected for processing. A determination is made at 703 whether there are any parent nodes associated with the selected leaf node. If not, then the process proceeds to 732 to determine if there are any further leaf nodes to select. If so, then the process returns back to 702 to select a new leaf node. If there are no further leaf nodes to select, then the process ends.

If the determination is made at 703 that there are one or more parent nodes to the leaf node, then one of the parent nodes is selected at 704. The selected node is checked to see if it has already been identified as part of the subgraph associated with the selected leaf node. If not, then the process identifies the parent node as being part of the subgraph associated with the selected leaf node at 706.

The process checks whether the node under consideration itself has any parent nodes at 708. If so, then the process actions of 710 are performed for each such parent node. A determination is made at 712 whether a parent node under examination has already been processed for the subgraph associated with the selected leaf node. If not, then the process recursively returns back to 704 with the parent node as the "selected" node for further processing. If the node has already been processed for the subgraph associated with the selected leaf node, then the process returns back to 708.

If there are no further parent nodes to be processed for the node under examination, then the process proceeds to 718. A determination is made whether the node under examination is eligible to be duplicated, e.g., which can be determined by considering whether the operation corresponding to the node is an inexpensive operation. As noted above, an example of an inexpensive operation is one that consumes a minimal amount of processing resources such that its duplication will not unduly burden the overall system.

If the node is not eligible to be duplicated, then a further determination is made whether there are any child nodes that have not yet processed for the node under examination (720). If so, then the process actions of 722 are performed for each such child node. A determination is made at 724 whether a child node under examination has already been processed for the subgraph associated with the selected leaf node. If not, then the process recursively returns back to 704 with the child node as the "selected" node for further processing. If the child node has already been processed for the subgraph associated with the selected leaf node, then the process returns back to 718.

If the entry to this portion of the process was by recursion from either 714 or 726, then the process returns back to its respective recursion entry point (730). Otherwise, the process proceeds to 731 to determine whether there are any further parent nodes to process. If so, then the process proceeds back to 704 to select another parent node for processing.

If there are no further parent nodes to process, then the process has finished identifying the nodes which are part of the subgraph for the selected leaf node. This set of nodes corresponds to a sequence of operations that can be processed independently and/or in parallel with other subgraphs of operations.

The process then proceeds to 732 to determine whether there are any additional leaf nodes to process. If so, then the process returns back to 702 to select another leaf node for processing for a new subgraph. If not, then the process ends.

On output, the process has defined groups, and can assign group memberships to each node of the graph. These groups form execution tasks that can be freely mapped to different CPUs. In some systems, there may be many more groups than available CPUs. For the mapping of groups (tasks) to CPUs, a lazy scheduling heuristic can be employed. After this mapping, the system can estimate overall execution time, which is used to generate or estimate an optimization target.

Figure 8A:
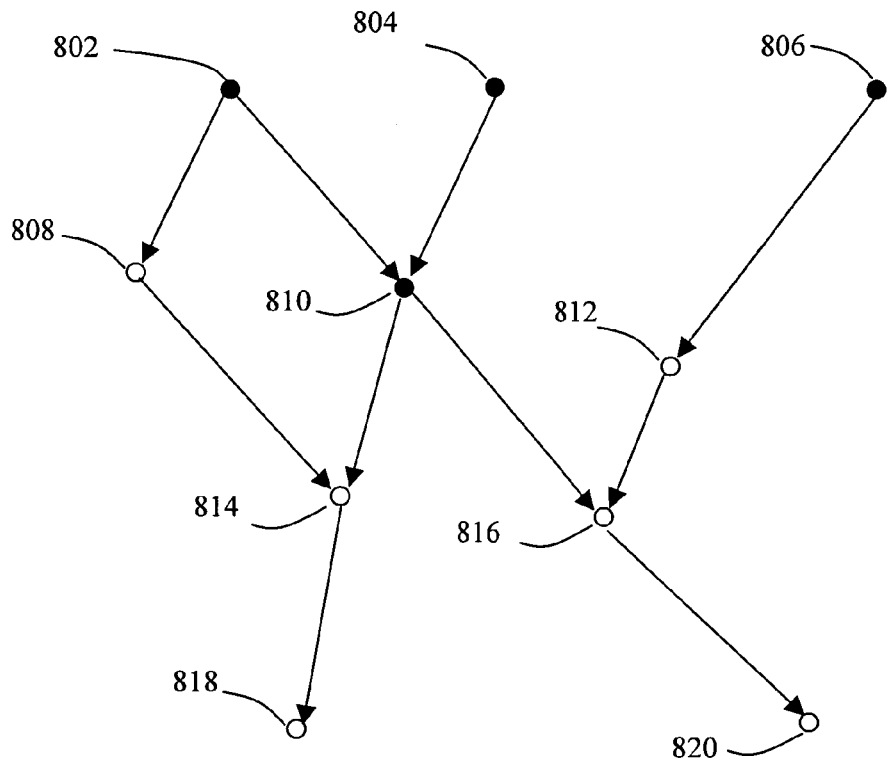

To illustrate this process, reference will now be made to the dependency graph shown in FIG. 8A. The dependency graph includes nodes 802, 804, 806, 808, 810, 812, 814, 816, 818, and 820. Two leaf nodes 818 and 820 exist in the dependency graph.

Nodes that are considered eligible for duplication (e.g., which correspond to inexpensive operations) are represented by filled, dark circles and nodes that are not eligible for duplication are represented by unfilled circles. Here, nodes 802, 804, 806, and 810 are considered eligible for duplication and nodes 808, 814, 816, 818, and 820 are not considered eligible for duplication.

To track the progress of the process, a chart is shown which identifies each node as well as the leaf subgraph(s) associated with that node. Each of the nodes that are eligible for duplication has the symbol "IE" printed next to the node identifier.

Figure 8B:
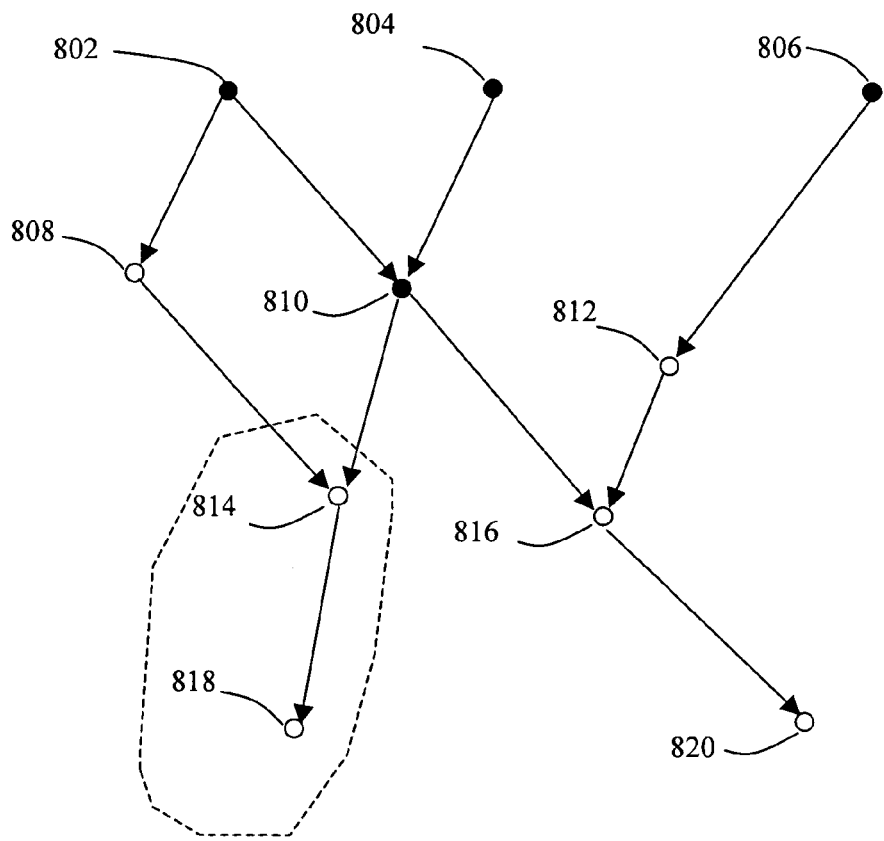

Assume that the leaf node first selected for processing is leaf node 818. A determination is whether there are any parent nodes to leaf node 818. It can be seen that node 814 is a parent node to leaf node 818. Referring to FIG. 8B, the process traverses upwards in the dependency graph from leaf node 818 to node 814. Both leaf node 818 and node 814 are identified as being part of the subgraph associated with leaf node 818.

Next, a determination is made whether there are any parent nodes to the node under examination (i.e., node 814). Here, node 814 has two parent nodes 808 and 810. One of the two parent nodes 808 or 810 is selected for processing.

Figure 8C:
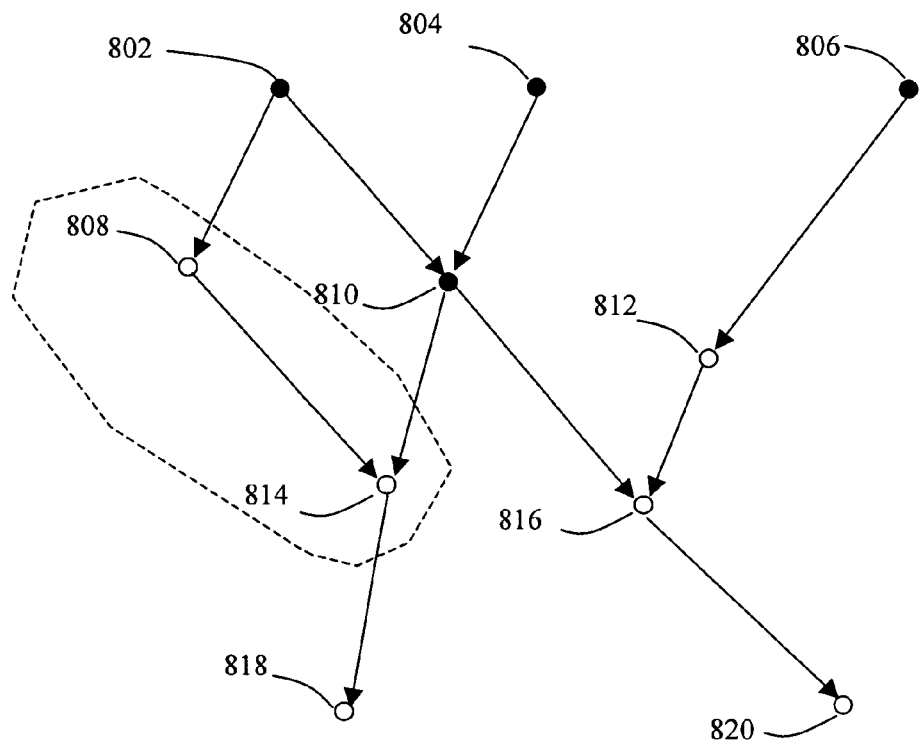

Referring to FIG. 8C, assume that parent node 808 is selected for processing. The process traverses upwards in the dependency graph from node 814 to node 808. Node 808 is identified as being part of the subgraph associated with leaf node 818.

Figure 8D:
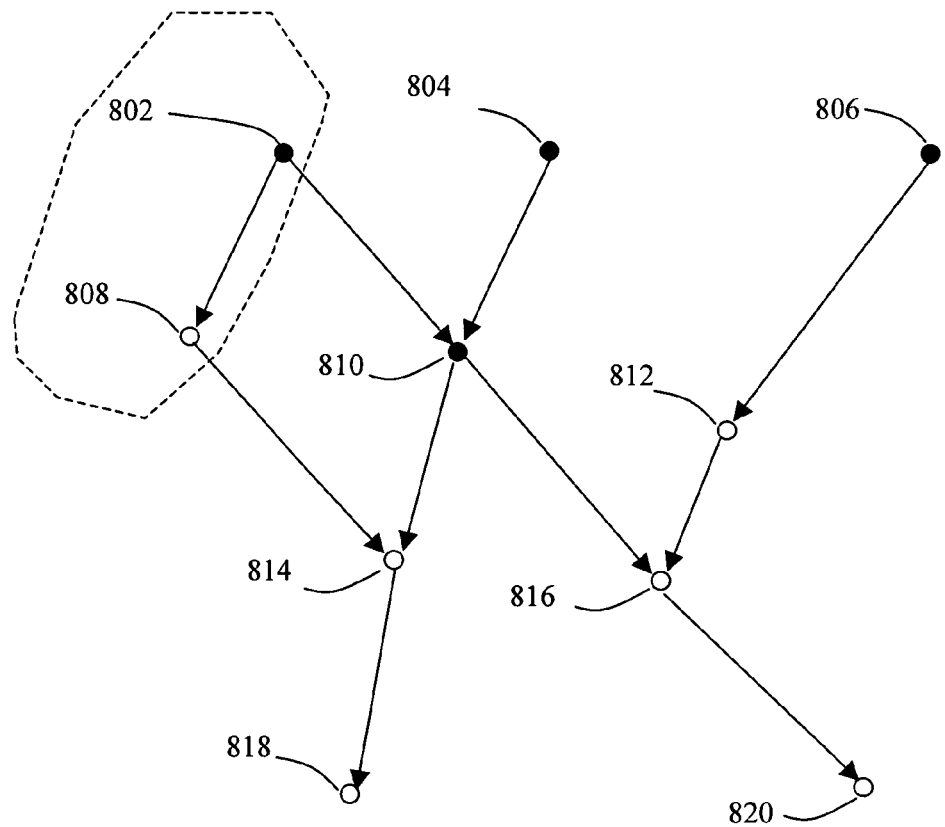

Next, a determination is made whether there are any parent nodes to the node under examination (i.e., node 808). Here, node 808 has a single parent node 802. This parent node is now selected for processing. Referring to FIG. 8D, the process traverses upwards in the dependency graph from node 808 to node 802. Node 802 is identified as being part of the subgraph associated with leaf node 818.

A determination is made whether there are any parent nodes to the node under examination (i.e., node 802). It can be seen that there are no parent nodes to node 802 (since it is an entry point to the dependency graph).

Figure 8E:
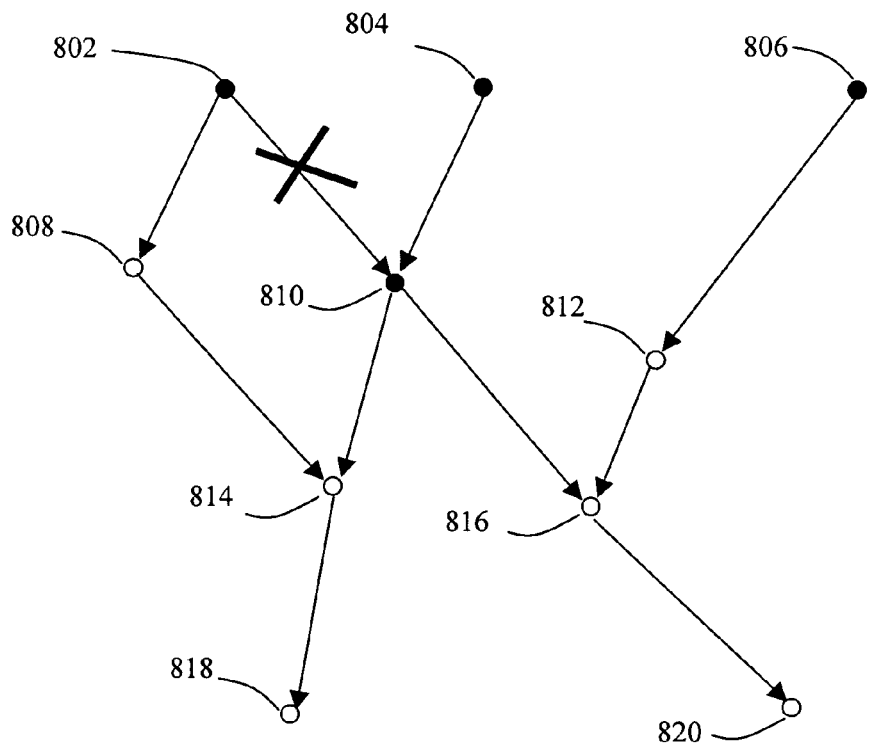

A determination is made whether node 802 corresponds to a node that is eligible for duplication. As noted above with respect to FIG. 7, if a node is eligible for duplication, then its children nodes are not immediately processed. If the node is not eligible for duplication, then its children node is processed immediately in the process. Since node 802 is a node eligible for duplication, the process will not traverse to its unprocessed child nodes at this point, as represented by the illustration of FIG. 8E.

The process then returns to consider whether there are any parent or children nodes that have not yet been processed for node 808. Here, there are no parent or children nodes to node 808 that have not yet been processed.

The process then returns to consider whether there are any parent nodes that have not yet been processed for node 814. As previously noted, node 814 has two parent nodes 808 and 810. Node 808 has already been processed. Therefore, node 810 is now selected for processing.

Figure 8F:
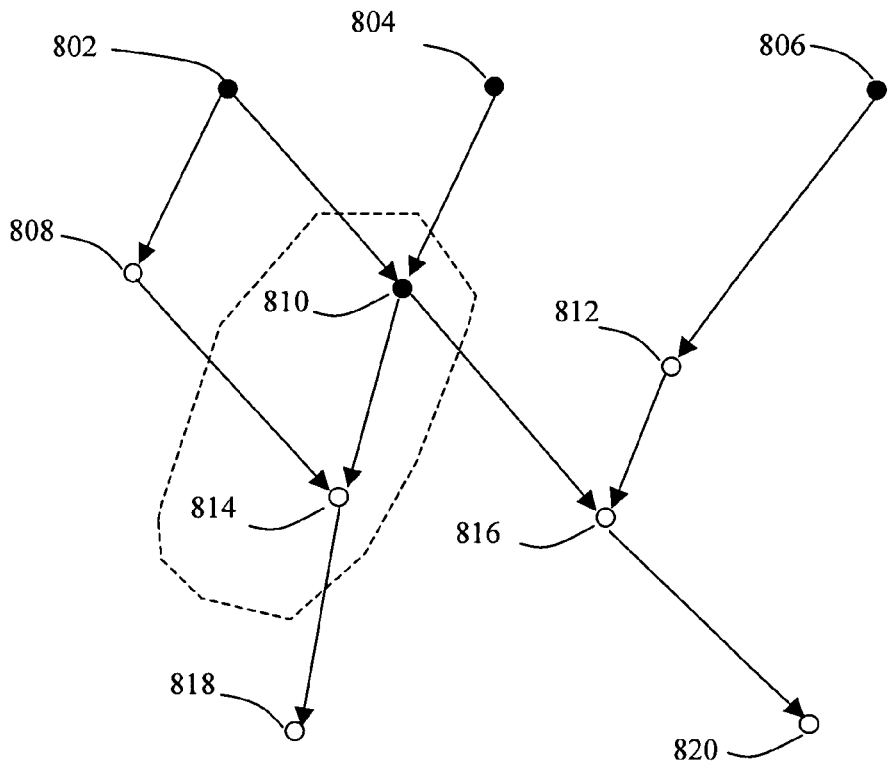

Referring to FIG. 8F, the process traverses upwards in the dependency graph from node 814 to node 810. Node 810 is identified as being part of the subgraph associated with leaf node 818.

Next, a determination is made whether there are any parent nodes to the node under examination (i.e., node 810). Here, node 810 has two parent nodes 802 and 804. One of the two parent nodes 802 or 804 is selected for processing.

Figure 8G:
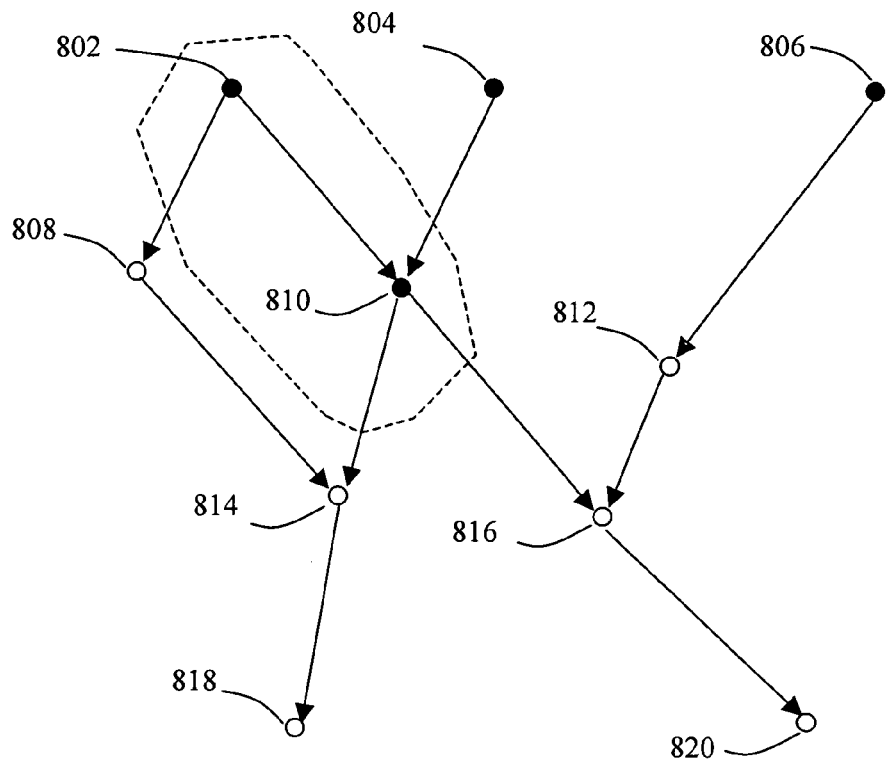

Referring to FIG. 8G, assume that parent node 802 is selected for processing. The process traverses upwards in the dependency graph from node 810 to node 802. It can be seen that node 802 has already been processed for the subgraph associated with leaf 818; therefore, the process returns back to consider other parent nodes to node 810.

Figure 8H:
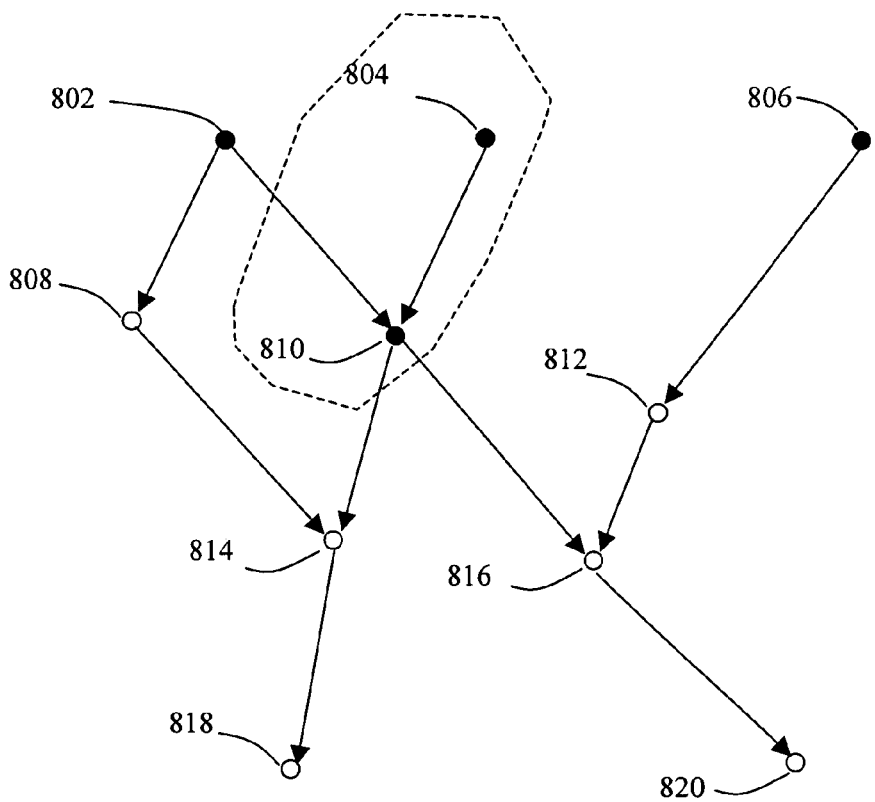

Referring to FIG. 8H, the process traverses upwards in the dependency graph from node 810 to node 804. Node 804 is identified as being part of the subgraph associated with leaf node 818.

A determination is made whether there are any parent nodes to the node under examination (i.e., node 804). It can be seen that there are no parent nodes to node 804 (since it is an entry point to the dependency graph).

A determination is made whether node 804 corresponds to a node that is eligible for duplication. Since node 804 is a node eligible for duplication, the process will not traverse to its children nodes at this point, which otherwise would not have occurred anyway since node 804 has no children nodes other than node 810, which has already been processed.

Figure 8I:
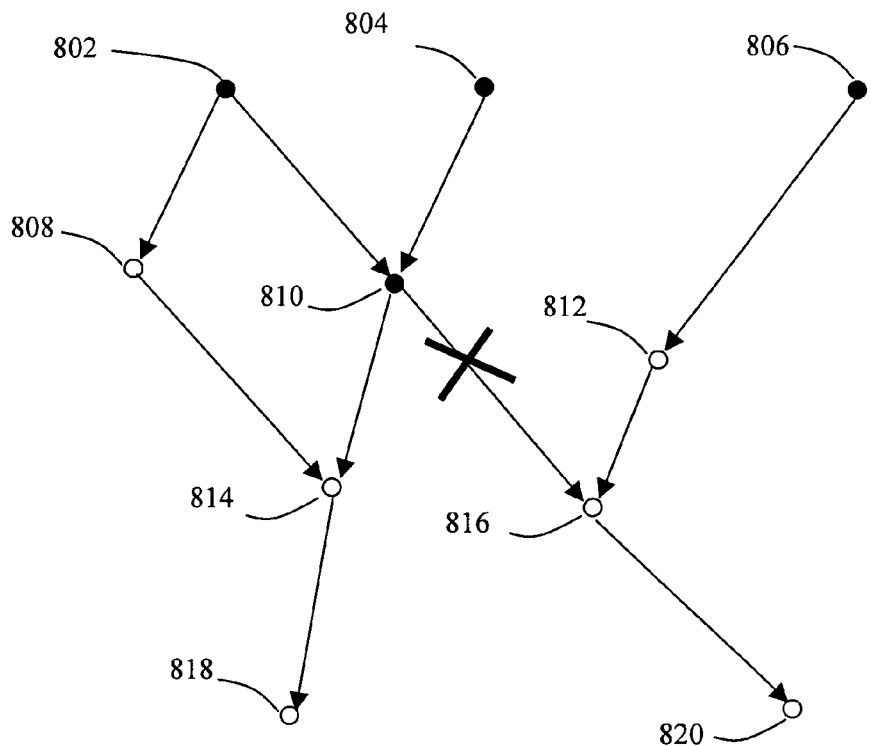

The process then returns to consider whether node 810 corresponds to a node that is eligible for duplication. Since node 810 is a node eligible for duplication, the process will not traverse to its unprocessed children nodes at this point, as shown in the illustration of FIG. 8I. This is despite the fact that node 810 has child node 816 that has not yet been processed.

The process then checks whether there are any unprocessed children nodes to node 814. The only child node to node 814 is leaf node 818, which has already been processed for the subgraph for selected leaf node 818.

Figure 8J:
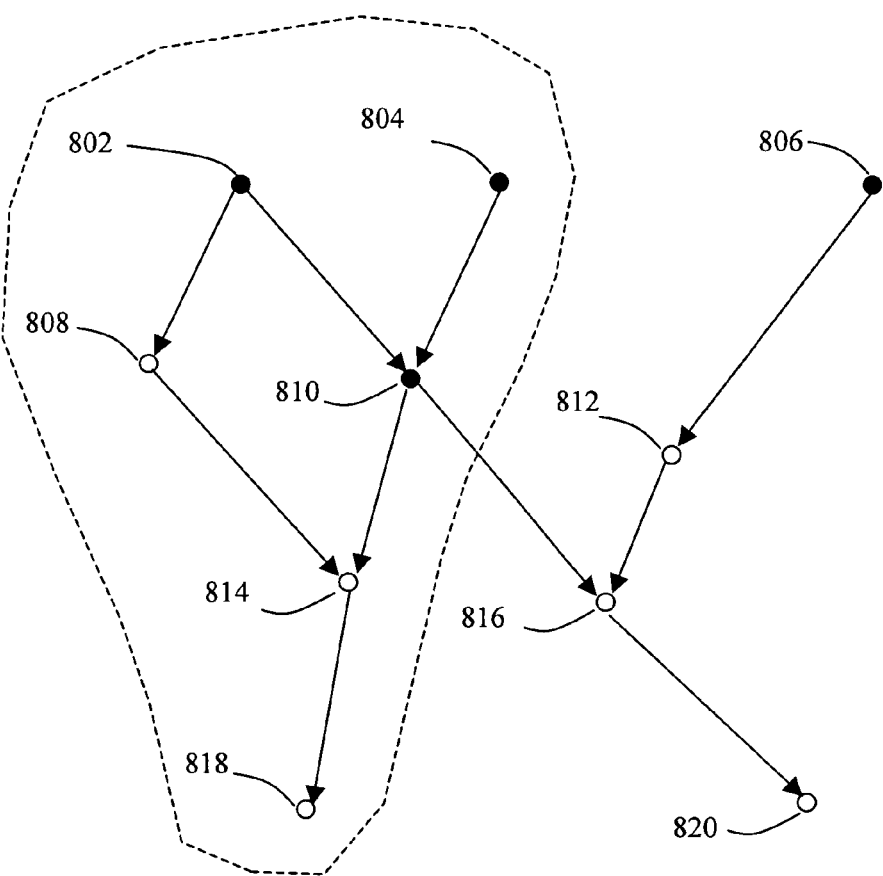

At this point, all parent nodes upwards from leaf node 818 have been processed. FIG. 8J shows a dashed border around all of the nodes in the dependency graph which has been identified as being associated with the subgraph for leaf node 818. This information can be extrapolated form the information contained within the recordation of node assignments that correlates each node to its respective subgraph(s) (e.g., as shown in the chart of FIG. 8J).

Figure 9A:
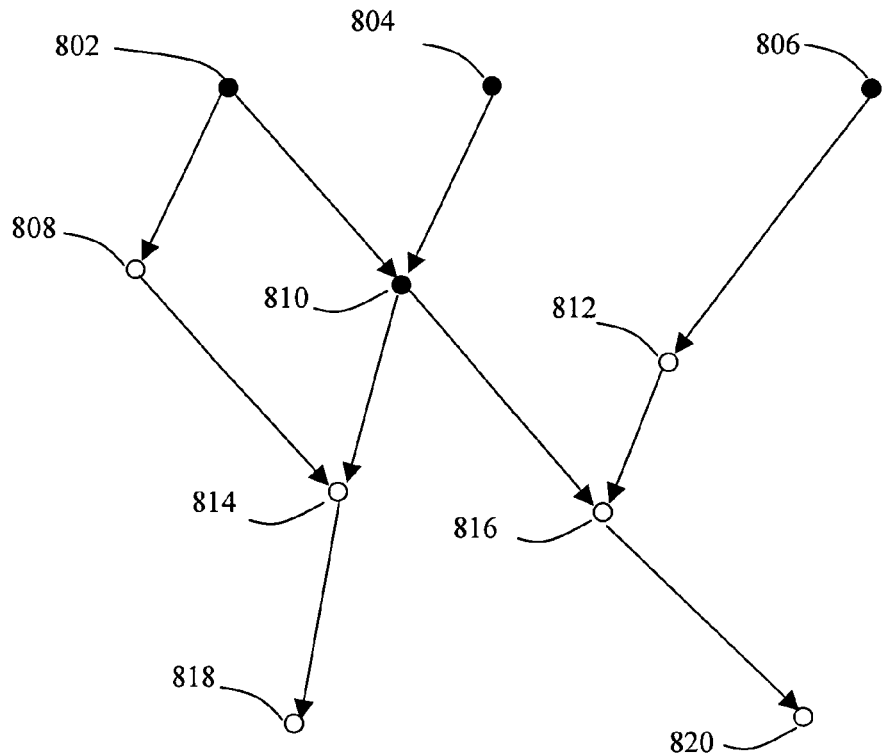

The process now proceeds to identify the nodes associated with a subgraph for the other leaf node 820. Referring to FIG. 9A, shown is the dependency graph with the chart filled in for the previous processing for the subgraph of leaf node 818.

Figure 9B:
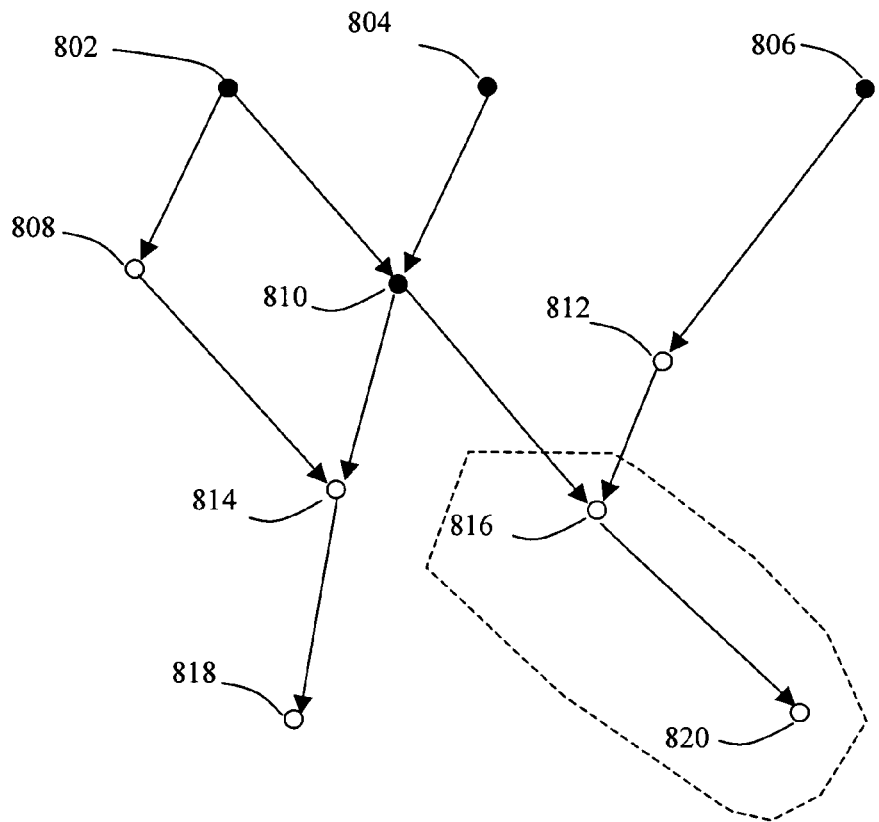

A determination is whether there are any parent nodes to leaf node 820. Here, it can be seen that node 816 is a parent node to leaf node 820. Referring to FIG. 9B, the process traverses upwards in the dependency graph from leaf node 820 to node 816. Both leaf node 820 and node 816 are identified as being part of the subgraph associated with leaf node 820.

Next, a determination is made whether there are any parent nodes to the node under examination (i.e., node 816). Here, node 816 has two parent nodes 810 and 812. One of the two parent nodes 810 or 812 is selected for processing.

Figure 9C:
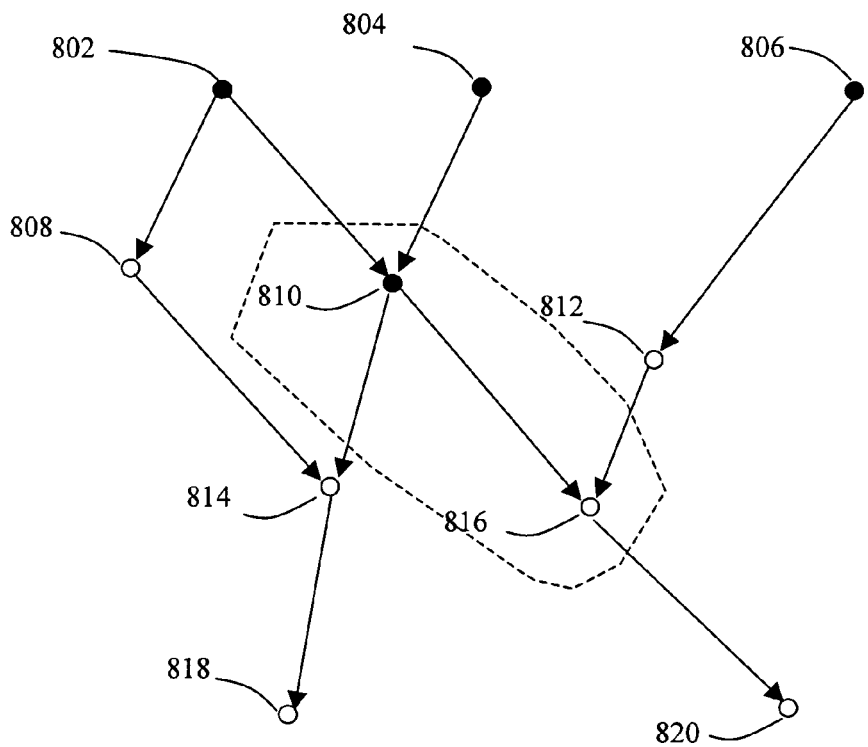

Referring to FIG. 9C, assume that parent node 810 is selected for processing. The process traverses upwards in the dependency graph from node 816 to node 810. Node 810 is identified as being part of the subgraph associated with leaf node 820.

Next, a determination is made whether there are any parent nodes to the node under examination (i.e., node 810). Here, node 810 has two parent nodes 802 and 804. One of the two parent nodes 802 or 804 is selected for processing.

Note that in addition to being associated with the subgraph for leaf 820, node 810 had previously been identified as being associated with the subgraph for leaf node 818. In this case, since node 810 is eligible for duplication, it is acceptable that this node is associated with both subgraphs 818 and 820.

Figure 9D:
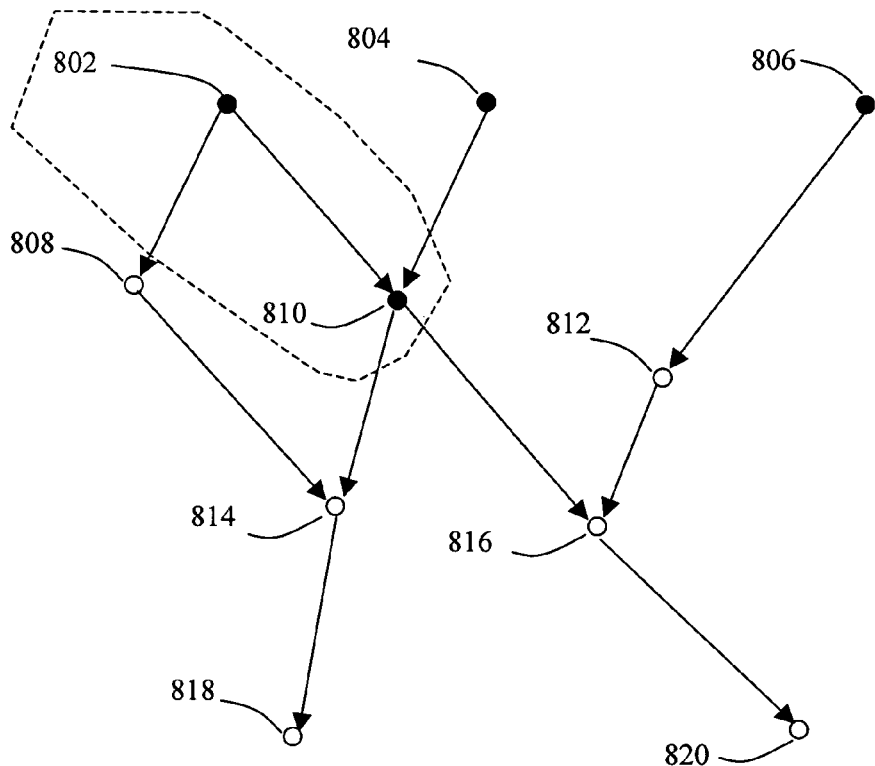

Referring to FIG. 9D, assume that parent node 802 is selected for processing. The process traverses upwards in the dependency graph from node 810 to node 802. Node 802 is identified as being part of the subgraph associated with leaf node 820.

A determination is made whether there are any parent nodes to the node under examination (i.e., node 802). It can be seen that there are no parent nodes to node 802 (since it is an entry point to the dependency graph).

Figure 9E:
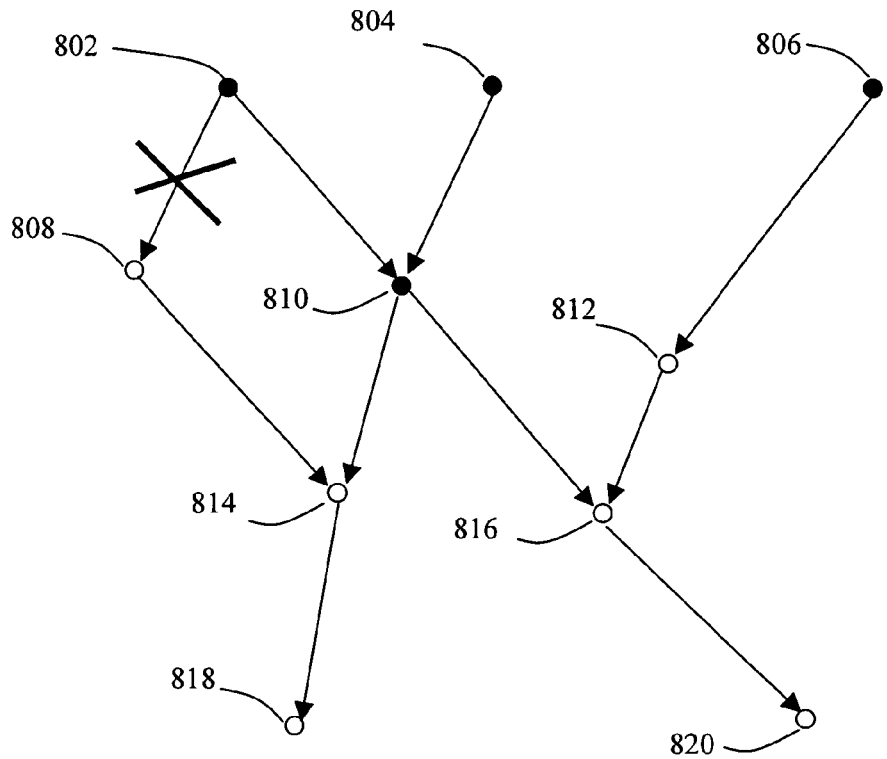

Next, a determination is made whether node 802 corresponds to a node that is eligible for duplication. Since node 802 is a node eligible for duplication, the process will not traverse to its unprocessed children nodes (e.g., node 808) at this point, as illustrated by FIG. 9E.

It is noted that in addition to being associated with the subgraph for leaf 820, node 810 has already been identified as being associated with the subgraph for leaf node 818. Similar to the circumstance for node 810, since node 802 is eligible for duplication, it is acceptable that this node is associated with both subgraphs 818 and 820.

Figure 9F:
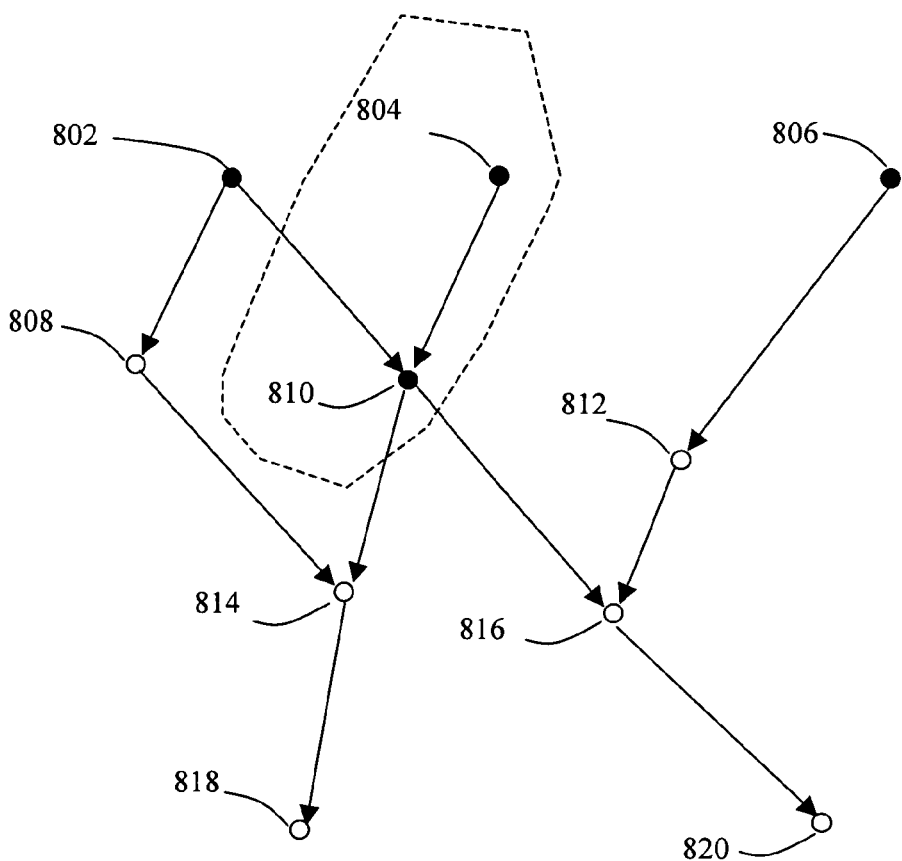

The process returns back to determine other parent nodes to node 810. Referring to FIG. 9F, the process traverses upwards in the dependency graph from node 810 to node 804. Node 804 is identified as being part of the subgraph associated with leaf node 820.

A determination is made whether there are any parent nodes to the node under examination (i.e., node 804). It can be seen that there are no parent nodes to node 804 (since it is an entry point to the dependency graph).

A determination is made whether node 804 corresponds to a node that is eligible for duplication. Since node 804 is a node eligible for duplication, the process will not traverse to its children nodes at this point, which otherwise would not have occurred anyway since node 804 has no children nodes other than node 810, which has already been processed.

Figure 9G:
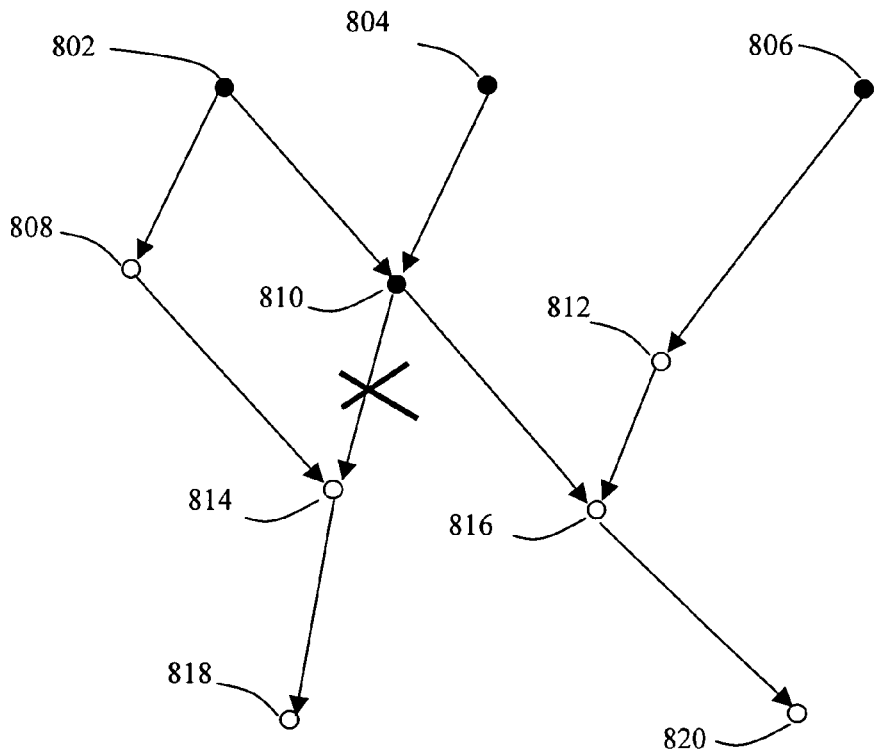

The process then returns to consider whether node 810 corresponds to a node that is eligible for duplication. Since node 810 is a node eligible for duplication, the process will not traverse to its children nodes at this point, as shown in the illustration of FIG. 9G. This is despite the fact that node 810 has child node 814 that has not yet been processed for the subgraph of leaf node 820.

It is noted that in addition to being associated with the subgraph for leaf 820, node 810 has already been identified as being associated with the subgraph for leaf node 818. Since node 810 is eligible for duplication, it is acceptable that this node is associated with both subgraphs 818 and 820.

The process then returns to consider whether there are any parent nodes that have not yet been processed for node 816. As previously noted, node 816 has two parent nodes 810 and 812. Node 810 has already been processed. Therefore, node 812 is now selected for processing.

Figure 9H:
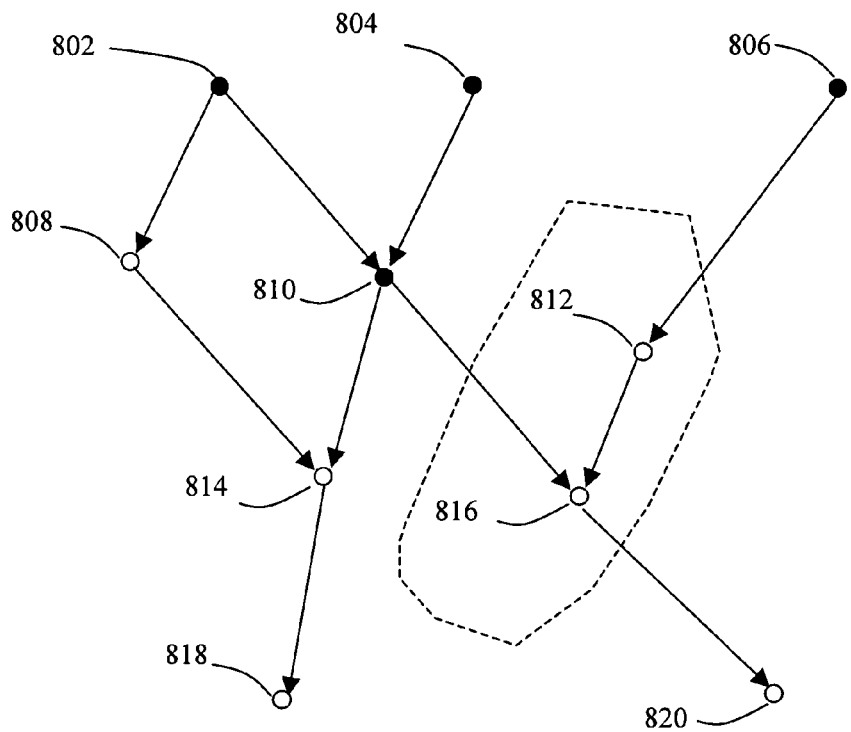

Referring to FIG. 9H, the process traverses upwards in the dependency graph from node 816 to node 812. Node 812 is identified as being part of the subgraph associated with leaf node 820.

Next, a determination is made whether there are any parent nodes to the node under examination (i.e., node 812). Here, node 812 has a single parent node 806. This parent node is now selected for processing. Referring to FIG. 9I, the process traverses upwards in the dependency graph from node 812 to node 806. Node 806 is identified as being part of the sub graph associated with leaf node 820.

A determination is made whether there are any parent nodes to the node under examination (i.e., node 806). It can be seen that there are no parent nodes to node 806 (since it is an entry point to the dependency graph).

A determination is made whether node 806 corresponds to a node that is eligible for duplication. Since node 806 is a node eligible for duplication, the process will not traverse to its children nodes at this point.

The process then checks whether there are any unprocessed children nodes to node 812. The only child node to node 812 is node 816, which has already been processed for the subgraph for selected leaf node 810.

The process then checks whether there are any unprocessed children nodes to node 816. The only child node to node 816 is leaf node 820, which has already been processed for the subgraph for selected leaf node 820.

Figure 9J:
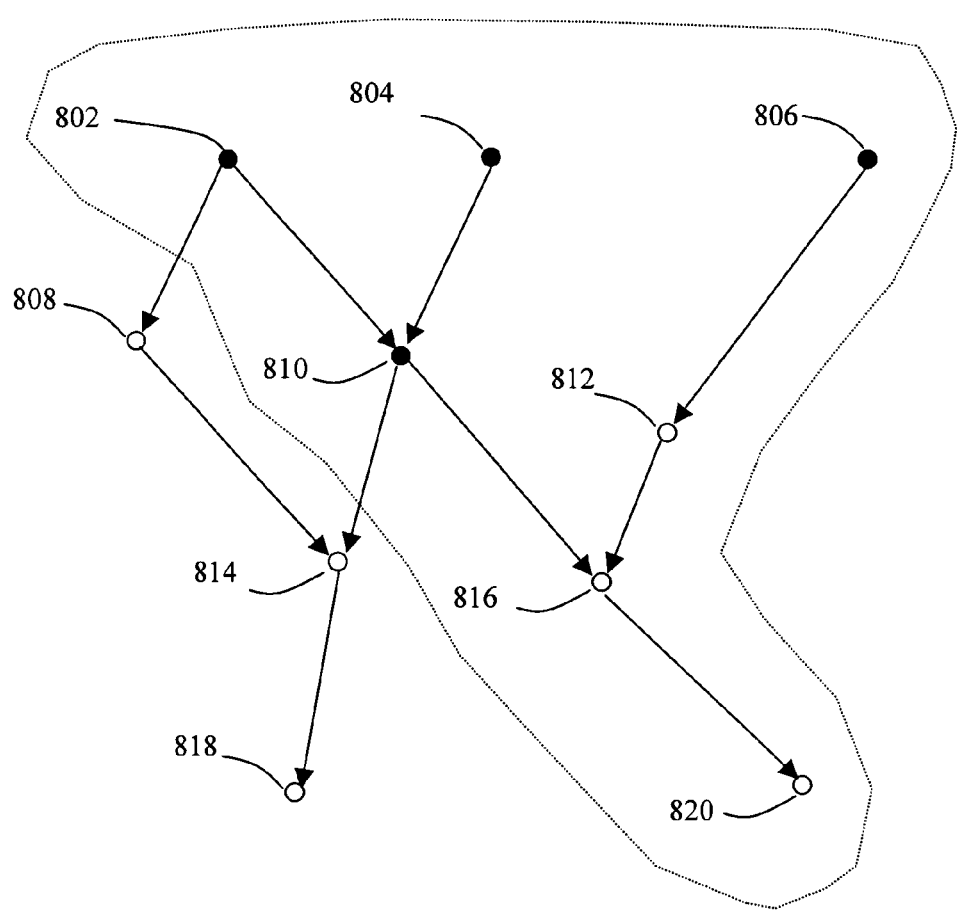

At this point, all parent nodes upwards from leaf node 820 have been processed. FIG. 9J shows a dotted border around all of the nodes in the dependency graph which has been identified as being associated with the subgraph for leaf node 820. This information can be extrapolated form the information contained within the recordation of node assignments that correlates each node to its respective subgraph(s) (e.g., as shown in the chart of FIG. 9J).

Figure 10:
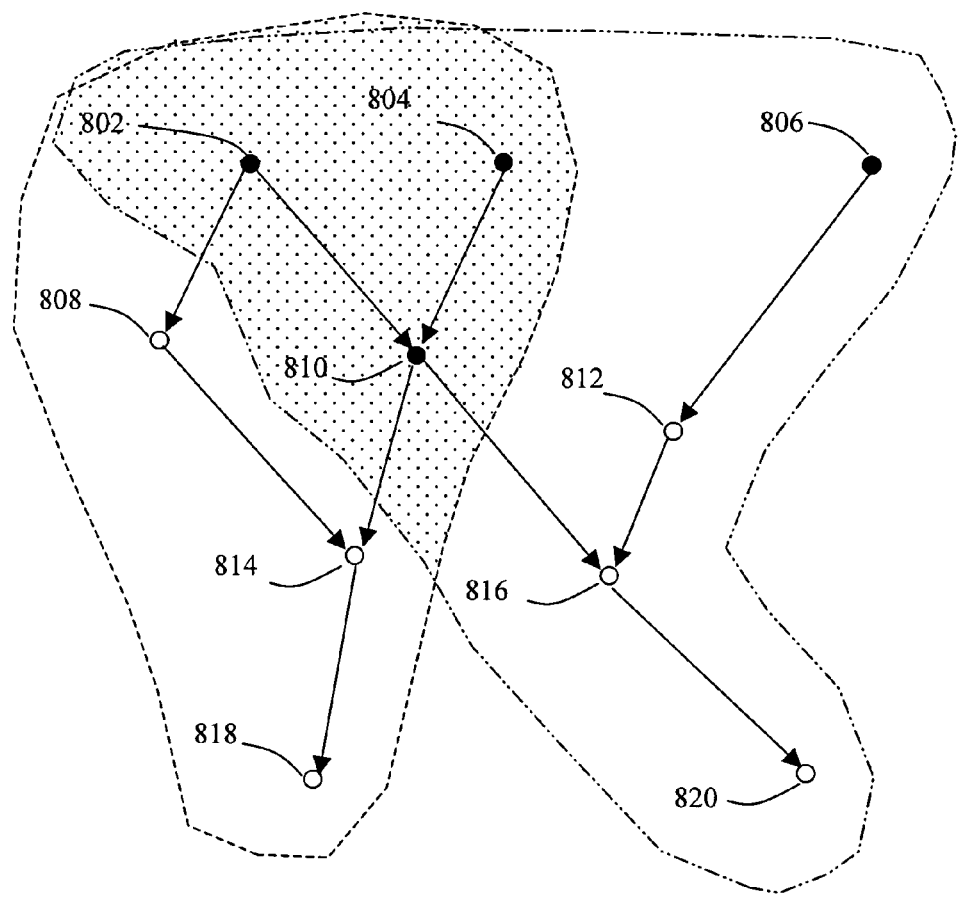
FIG. 10 shows overlapping nodes between two subgraphs.

FIG. 10 shows the overlap of duplicated nodes between the two subgraphs associated with leaf nodes 818 and 820. In this case, nodes 802, 804, and 810 have been identified as nods to be duplicated between the two subgraphs. This means that when each subgraph is processed, the operations associated with the duplicated nodes will be processed multiple times, at least once by each CPU associated with each subgraph.

Application to EDA Tools

The electronic design process for an integrated circuit (IC) involves describing the behavioral, architectural, functional, and structural attributes of an IC or electronic system. Design teams often begin with very abstract behavioral models of the intended product and end with a physical description of the numerous structures, devices, and interconnections on an IC chip. Semiconductor foundries use the physical description to create the masks and test programs needed to manufacture the ICs. EDA tools are extensively used by designers throughout the process of designing and verifying electronic designs.

A Physical Verification (PV) tool is a common example of a EDA tool that is used by electronics designers. PV is one of the final steps that is performed before releasing an IC design to manufacturing. Physical verification ensures that the design abides by all of the detailed rules and parameters that the foundry specifies for its manufacturing process. Violating a single foundry rule can result in a silicon product that does not work for its intended purpose. Therefore, it is critical that thorough PV processing is performed before finalizing an IC design. Physical Verification tools may be used frequently and at many stages of the IC design process. As noted above, PV tools may be used during design and at tape-out to ensure compliance with physical and electrical constraints imposed by the manufacturing process. In addition, PV tools may also be used after tape-out to verify and ensure manufacturability of the design and its constituent elements.

PV tools read and manipulate a design database which stores information about device geometries and connectivity. Because compliance with design rules generally constitutes the gating factor between one stage of the design and the next, PV tools are typically executed multiple times during the evolution of the design and contribute significantly to the project's critical path. Therefore, reducing PV tool execution time makes a major contribution to the reduction of overall design cycle times.

As the quantity of data in modern IC designs become larger and larger over time, the execution time required to process EDA tools upon these IC designs also becomes greater. For example, the goal of reducing PV tool execution time is in sharp tension with many modern IC designs being produced by electronics companies that are constantly increasing in complexity and number of transistors. The more transistors and other structures on an IC design the greater amounts of time that is normally needed to perform PV processing. This problem is exasperated for all EDA tools by constantly improving IC manufacturing technologies that can create IC chips at ever-smaller feature sizes, which allows increasingly greater quantities of transistors to be placed within the same chip area, as well resulting in more complex physical and lithographic effects during manufacture.

In existing approaches to parallelize EDA processing, subgraphs are constructed solely using execution time via a "lazy scheduling" algorithm, in which a list of available tasks is managed such that each time Processors ("CPUs") become available, the computationally most demanding task is assigned to the fastest available CPU. Such a 1:1 assignment of tasks to CPUs disregards communication costs, and, before a given task can be executed, a CPU must wait for the task's predecessor in the dependency graph to complete. Synchronization and communication is achieved by writing and reading data to/from the layout database. Such approach is efficient when data are available to all CPUs in memory, i.e., on shared-memory multi-processors. On distributed-memory multi-processors (for example networks of computers), the above rule-by-rule synchronization is expensive, as it requires communication between processors (on networks of computers via network data exchange). Moreover, for DRC systems, frequent synchronizations between CPUs do not allow for efficient rule packaging.

Embodiments of the present invention can be used to more efficiently perform parallel processing of EDA functionality, such as performing rule checking for DRC operations. For example, rule-based parallelism can be employed in which some or all of the rules are executed in parallel. This works because a rule deck operates on multiple layers, and can often be processed independently.

Most rule languages are essentially linear lists of atomic operations on layers. The atomic operations include geometric operations such as Booleans and sizing, operations involving connectivity and measurement operations (such as Select, Counts, Area, etc.). Some rule languages include control flow constructs such as procedures, branches and loops. However, loop break criteria are not to be data dependent in some embodiments. Because of this, a rule language that is extended with control flow primitives can be statically translated into one or more linear lists of atomic operations. Although typically, a rule language features a large number of atomic operations, only a small subset of the available operations is used frequently in a deck.

Once a rule deck is translated into a linear list of atomic operations, a dependency graph can be built, as shown in FIG. 1. The processes of FIGS. 5 and 7 can be used to identify independent sequences of rules operations that can be processed in parallel.

Some embodiments decompose a rule dependency graph into sub-graphs, the execution of which does not require communication. In other words, each sub-graph can be entirely mapped to a given CPU and be completely executed without knowledge of execution state of another sub-graph. This partitioning is achieved by allowing nodes of the graph to be replicated on multiple CPUs. This is in stark contrast to the traditional approach, in which each node of the dependency graph is only executed once. This algorithm can easily be combined with rule-packaging and window-based parallelization.

The subgraphs generated by the above processes correspond to operations that translate into sets of jobs/instructions/workload which will be executed to perform PV processing upon a given IC layout.

The PV jobs can also be processed in parallel by multiple different processing entities. Examples of such processing entities include processes, threads, tasks, CPUs, nodes, and/or networked computing stations. In some embodiment, massively parallel systems can be employed to reduce overall run times on large designs, with the PV tool making efficient use of networks of parallel computers, e.g., with more than 50-100 CPUs.

When considering parallelization of rule execution, a trade off can be made between the numbers of computers used to speed up the execution versus the overhead of communication necessary to execute a given rule in parallel. This tradeoff is heavily dependent on database size and structure, and is efficiently considered in the present invention by dynamic considering information about the design layout during the rules compilation process.

The parallel execution in the EDA system can be executed in parallel using, for example, either the distributed-memory parallel approach or the shared-memory parallel approach. The distributed-memory parallel approach involves software that can make efficient use of multiple processing devices, such as CPUs, where each CPU may access its own memory. With respect to implementation, message passing primitives (such as UNIX sockets, MPI, PVM, etc.) are typically employed when coordinating execution of program components running on different CPUs. The shared-memory parallel approach involves software that makes use of multiple processing devices, e.g., CPUs, that can address common physical memory. With respect to implementation, shared memory can be allocated, read and written from all program components being executed on different CPUs. Coordination is accomplished via atomic memory accesses, also called semaphores. Sometimes, shared-memory parallel programming is referred to as multi-threading.

In some embodiments, the parallel processing is performed using distributed-memory parallelization. However, if the product's memory consumption is efficient; a distributed-memory parallel program can be ported to a shared-memory machine by emulating a distributed computer network on a shared-memory computer. Due to increased spatial locality, in some cases, a distributed parallel program ported back to a shared memory parallel machine runs faster than a similar program developed from the beginning using the shared-memory parallel programming paradigm.

To conclude, there are many software applications in which dependency graphs are used for parallelization and performance improvement (for example database queries, gaming applications, search algorithms, etc.). The invention described herein can be applicable to any or all of these applications. This produces the counter-intuitive, and surprising result, that performing more operations (albeit in parallel) to reduce the overall run-time.

System Architecture Overview

Figure 11:
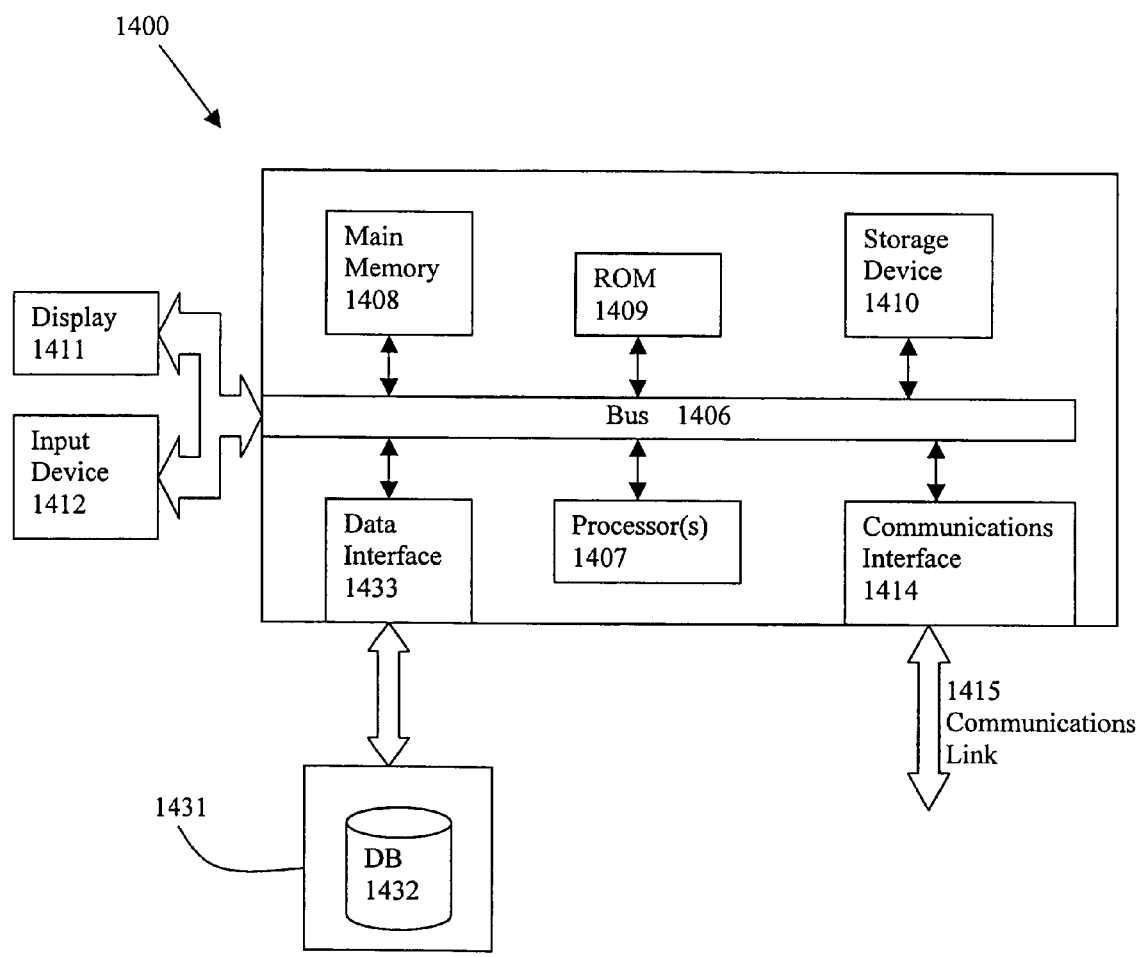
FIG. 11 illustrates an example computing architecture with which the invention may be implemented.

FIG. 11 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media, volatile media, and transmission media. Non-volatile media includes, for example, optical or magnetic disks, such as disk drive 1410. Volatile media includes dynamic memory, such as system memory 1408. Transmission media includes coaxial cables, copper wire, and fiber optics, including wires that comprise bus 1406. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for implementing physical verification of an electronic design, comprising:
    (a) constructing a dependency graph to analyze a set of operations associated with design rule checking of the electronic design, wherein the dependency graph comprises two or more subgraphs;
    (b) identifying overlapping operations and determining which of the overlapping operations should be duplicated, in which determining which of the overlapping operations should be duplicated is based upon the expense of a given operation, where at least one inexpensive operation is duplicated and at least one expensive operation is not duplicated;
    (c) duplicating the overlapping operations determined in (b) among two or more subgraphs; and
    (d) executing physical verification on the electronic design, in which two or more of the duplicated operations are executed in parallel.

2. The method of claim 1 in which the dependency graph is constructed with vertices corresponding to operations to be executed and edges corresponding to layers that create dependencies.

3. The method of claim 1 in which at least one of the following parameters are employed to determine expense of an operation: CPU utilization, network usage, data volume.

4. The method of claim 1 in which the dependency graph is divided into the two or more sub graphs that overlap.

5. The method of claim 4 in which a bottom up approach is employed to divide the dependency graph, in which the two or more subgraphs are associated with one or more identified leafs nodes from the bottom of the dependency graph, with each of the leaf nodes associated with a output or terminating operation for a sequence of operations.

6. The method of claim 5 in which a group identifier is associated with each node of the graph.

7. The method of claim 4 in which lazy scheduling is employed to divide the dependency graph is divided into the two or more sub graphs.

8. The method of claim 1 in which the physical verification is executed to perform design rule checking on the electronic design.

9. A computer implemented method for parallel execution of processing a set of computing operations in a computing system, comprising:
(a) constructing a dependency graph to analyze the set of operations associated, the dependency graph comprising two or more subgraphs;
(b) identifying overlapping operations and determining which of the overlapping operations should be duplicated, in which determining which of the overlapping operations should be duplicated is based upon the expense of a given operation, where at least one inexpensive operation is duplicated and at least one expensive operation is not duplicated;
(c) duplicating the overlapping operations determined in (b) among the two or more subgraphs; and
(d) executing the duplicated operations of the two or more subgraphs using at least two different processing entities.

10. The method of claim 9 in which the dependency graph is constructed with vertices corresponding to operations to be executed and edges corresponding to layers that create dependencies.

11. The method of claim 9 in which at least one of the following parameters are employed to determine expense of an operation: CPU utilization, network usage, data volume.

12. The method of claim 9 in which the dependency graph is divided into the two or more sub graphs that overlap.

13. The method of claim 12 in which a bottom up approach is employed to divide the dependency graph, in which the two or more subgraphs are associated with one or more identified leafs nodes from the bottom of the dependency graph, with each of the leaf nodes associated with a output or terminating operation for a sequence of operations.

14. The method of claim 13 in which a group identifier is associated with each node of the graph.

15. The method of claim 12 in which lazy scheduling is employed to divide the dependency graph is divided into the two or more sub graphs.

16. A system for parallel execution of processing a set of computing operations in a computing system, comprising:
(a) means for constructing a dependency graph to analyze the set of operations associated, the dependency graph comprising two or more subgraphs;
(b) means for identifying overlapping operations and determining which of the overlapping operations should be duplicated, in which the means for determining which of the overlapping operations should be duplicated is based upon the expense of a given operation, where at least one inexpensive operation is duplicated and at least one expensive operation is not duplicated;
(c) means for duplicating the overlapping operations determined in (b) among two or more subgraphs; and
(d) means for executing the duplicated operations of the two or more subgraphs using at least two different processing entities.

17. The system of claim 16 in which the dependency graph is constructed with vertices corresponding to operations to be executed and edges corresponding to layers that create dependencies.

18. A computer program product comprising a tangible computer usable medium having executable code to execute a process for parallel execution of processing a set of computing operations in a computing system, comprising:
(a) constructing a dependency graph to analyze the set of operations associated, the dependency graph comprising two or more subgraphs;
(b) identifying overlapping operations and determining which of the overlapping operations should be duplicated, in which determining which of the overlapping operations should be duplicated is based upon the expense of a given operation, where at least one inexpensive operation is duplicated and at least one expensive operation is not duplicated;
(c) duplicating the overlapping operations determined in (b) among two or more subgraphs; and
(d) executing the duplicated operations of the two or more subgraphs using at least two different processing entities.

19. The product of claim 18 in which the dependency graph is constructed with vertices corresponding to operations to be executed and edges corresponding to layers that create dependencies.

20. A system for implementing physical verification of an electronic design, comprising:
(a) means for constructing a dependency graph to analyze a set of operations associated with design rule checking of the electronic design, wherein the dependency graph comprises two or more subgraphs;
(b) means for identifying overlapping operations and determining which of the overlapping operations should be duplicated, in which the means for determining which of the overlapping operations should be duplicated is based upon the expense of a given operation, where at least one inexpensive operation is duplicated and at least one expensive operation is not duplicated;
(c) means for duplicating the overlapping operations determined in (b) among two or more subgraphs; and
(d) means for executing physical verification on the electronic design, in which two or more of the duplicated operations are executed in parallel.

21. The system of claim 20 in which the dependency graph is constructed with vertices corresponding to operations to be executed and edges corresponding to layers that create dependencies.

22. A computer program product comprising a tangible computer usable medium having executable code to execute a process for implementing physical verification of an electronic design, comprising:
(a) constructing a dependency graph to analyze a set of operations associated with design rule checking of the electronic design, wherein the dependency graph comprises two or more subgraphs;
(b) identifying overlapping operations and determining which of the overlapping operations should be duplicated, in which determining which of the overlapping operations should be duplicated is based upon the expense of a given operation, where at least one inexpensive operation is duplicated and at least one expensive operation is not duplicated;
(c) duplicating the overlapping operations determined in (b) among two or more subgraphs; and
(d) executing physical verification on the electronic design, in which two or more of the duplicated operations are executed in parallel.

23. The product of claim 22 in which the dependency graph is constructed with vertices corresponding to operations to be executed and edges corresponding to layers that create dependencies.

* * * * *